US011159329B2

(12) United States Patent
Chen

(10) Patent No.: US 11,159,329 B2
(45) Date of Patent: Oct. 26, 2021

(54) COLLABORATIVE OPERATING SYSTEM

(71) Applicant: JRSYS International Corp., Taipei (TW)

(72) Inventor: Jia-Hong Chen, Taipei (TW)

(73) Assignee: JRSYS INTERNATIONAL CORP., Taipei (TW)

( * ) Notice: Subject to any disclaimer, the term of this patent is extended or adjusted under 35 U.S.C. 154(b) by 180 days.

(21) Appl. No.: 16/599,371

(22) Filed: Oct. 11, 2019

(65) Prior Publication Data

US 2020/0044867 A1 Feb. 6, 2020

Related U.S. Application Data

(62) Division of application No. 15/667,985, filed on Aug. 3, 2017, now Pat. No. 10,541,819.

(30) Foreign Application Priority Data

Aug. 4, 2016 (CN) .......................... 201610633248.0

(51) Int. Cl.
*H04L 29/06* (2006.01)
*H04L 9/00* (2006.01)
(Continued)

(52) U.S. Cl.
CPC .......... *H04L 9/3247* (2013.01); *H04L 9/0897* (2013.01); *H04L 63/0428* (2013.01);
(Continued)

(58) Field of Classification Search
CPC ... H04L 9/3247; H04L 67/025; H04L 9/0897; H04L 63/123; H04L 63/0428;
(Continued)

(56) References Cited

U.S. PATENT DOCUMENTS 8,385,321 B2 * 2/2013 Tien .................. G06F 16/27
   370/350
9,729,524 B1 * 8/2017 Brandwine .......... H04L 9/3247
(Continued)

FOREIGN PATENT DOCUMENTS

CN    101212295 A    7/2008

OTHER PUBLICATIONS

Chinese Office Action and Search Report for Chinese Application No. 201610633248.0, dated Jan. 10, 2020, with an English translation.

*Primary Examiner* — Shewaye Gelagay
*Assistant Examiner* — Kevin Ayala
(74) *Attorney, Agent, or Firm* — Birch, Stewart, Kolasch & Birch, LLP

(57) ABSTRACT

A collaborative operating system includes: a secure command generating device, for performing a digital signature operation on a first-station command to generate a first-station command request, for performing a digital signature operation on a second-station command to generate a second-station command request, and for performing a digital signature operation on a third-station command to generate a third-station command request; a first device group instructs a first target device to execute a first target command only if the first-station command request passed authentication processes conducted by the first device group; a second device group instructs a second target device to execute a second target command only if the second-station command request passed authentication processes conducted by the second device group; and a third device group instructs a third target device to execute a third target command only if the third-station command request passed authentication processes conducted by the third device group.

10 Claims, 12 Drawing Sheets

(51) Int. Cl.
   *H04L 9/32*     (2006.01)
   *H04W 4/70*    (2018.01)
   *H04L 29/08*   (2006.01)
   *H04L 9/08*    (2006.01)

(52) U.S. Cl.
   CPC .......... *H04L 63/123* (2013.01); *H04L 67/025* (2013.01); *H04W 4/70* (2018.02); *H04L 63/0245* (2013.01); *H04L 63/0823* (2013.01); *H04L 63/104* (2013.01)

(58) Field of Classification Search
   CPC ............... H04L 63/0823; H04L 63/104; H04L 63/0245; H04W 4/70; H04W 12/10; H04W 12/08
   See application file for complete search history.

(56) References Cited

U.S. PATENT DOCUMENTS

| | | | | |
|---|---|---|---|---|
| 2005/0246534 | A1* | 11/2005 | Kirkup | H04W 12/06 713/170 |
| 2008/0282348 | A1* | 11/2008 | Proudler | G06F 21/57 726/22 |
| 2014/0358289 | A1* | 12/2014 | Davies | G05D 16/2053 700/275 |
| 2016/0014114 | A1* | 1/2016 | Pahl | H04L 9/3247 713/156 |
| 2016/0112203 | A1* | 4/2016 | Thom | G06F 21/53 713/176 |
| 2016/0182487 | A1* | 6/2016 | Zhu | H04L 63/083 726/9 |

\* cited by examiner

COLLABORATIVE OPERATING SYSTEM

CROSS-REFERENCE TO RELATED APPLICATIONS

This application is a Divisional of co-pending U.S. patent application Ser. No. 15/667,985, filed on Aug. 3, 2017, which claims the benefit of priority to Patent Application No. 201610633248.0, filed in China on Aug. 4, 2016; the entirety of which is incorporated herein by reference for all purposes.

BACKGROUND

The disclosure generally relates to a technology of network communication security control and, more particularly, to a collaborative operating system.

As the progress of Internet technologies, related applications have become much more diversified than before. Since enormous amount of service devices for use in commercial applications or consumer utilization have been developed, various types of information security threats will become more troublesome. For example, in the upcoming era of IoT (Internet of things), the quantity of networking devices will increase more dramatically, and most communications and interactions among these networking devices will be automatically conducted without user intervention. In addition, when the concept of smart manufacturing like Industry 4.0 is widely applied, more and more devices need to automatically conduct collaborative operations with each other to achieve specific task without user intervention.

However, malicious program codes or intruders within the Internet or other networking environments may invade into the system through the interaction among networking devices and utilize forged command to maliciously manipulate the infected devices to perform various operations, thereby resulting in unpredictable damages and adverse consequence.

SUMMARY

An example embodiment of a collaborative operating system is disclosed, comprising: a secure command generating device, arranged to perform a digital signature operation on a first-station command to generate a first-station command request, to perform a digital signature operation on a second-station command to generate a second-station command request, and to perform a digital signature operation on a third-station command to generate a third-station command request; a first device group; a second device group; and a third device group. The first device group comprises: a first command transmitting device, arranged to receive and transmit the first-station command request; a first target device; and a first command authentication circuit comprising: a first communication interface, arranged to communicate with the first command transmitting device or the first target device, and to receive the first-station command request; a first secure micro-controller, arranged to store a signature verification key of the secure command generating device; a first control circuit, coupled with the first communication interface and the first secure micro-controller, arranged to communicate with the first command transmitting device or the first target device through the first communication interface, and to cooperate with the first secure micro-controller to authenticate the first-station command request using the signature verification key; and a first storage circuit, coupled with the first control circuit, and arranged to store data required for operations of the first control circuit; wherein the first control circuit further instructs the first target device to execute a first target command corresponding to the first-station command request only if the first-station command request passed authentication processes conducted by the first secure micro-controller and the first control circuit. The second device group comprises: a second command transmitting device, arranged to receive and transmit the second-station command request; a second target device; and a second command authentication circuit comprising: a second communication interface, arranged to communicate with the second command transmitting device or the second target device, and to receive the second-station command request; a second secure micro-controller, arranged to store the signature verification key of the secure command generating device; a second control circuit, coupled with the second communication interface and the second secure micro-controller, arranged to communicate with the second command transmitting device or the second target device through the second communication interface, and to cooperate with the second secure micro-controller to authenticate the second-station command request using the signature verification key; and a second storage circuit, coupled with the second control circuit, and arranged to store data required for operations of the second control circuit; wherein the second control circuit further instructs the second target device to execute a second target command corresponding to the second-station command request only if the second-station command request passed authentication processes conducted by the second secure micro-controller and the second control circuit. The third device group comprises: a third command transmitting device, arranged to receive and transmit the third-station command request; a third target device; and a third command authentication circuit comprising: a third communication interface, arranged to communicate with the third command transmitting device or the third target device, and to receive the third-station command request; a third secure micro-controller, arranged to store the signature verification key of the secure command generating device; a third control circuit, coupled with the third communication interface and the third secure micro-controller, arranged to communicate with the third command transmitting device or the third target device through the third communication interface, and to cooperate with the third secure micro-controller to authenticate the third-station command request using the signature verification key; and a third storage circuit, coupled with the third control circuit, and arranged to store data required for the operation of the third control circuit; wherein the third control circuit further instructs the third target device to execute a third target command corresponding to the third-station command request only if the third-station command request passed authentication processes conducted by the third secure micro-controller and the third control circuit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
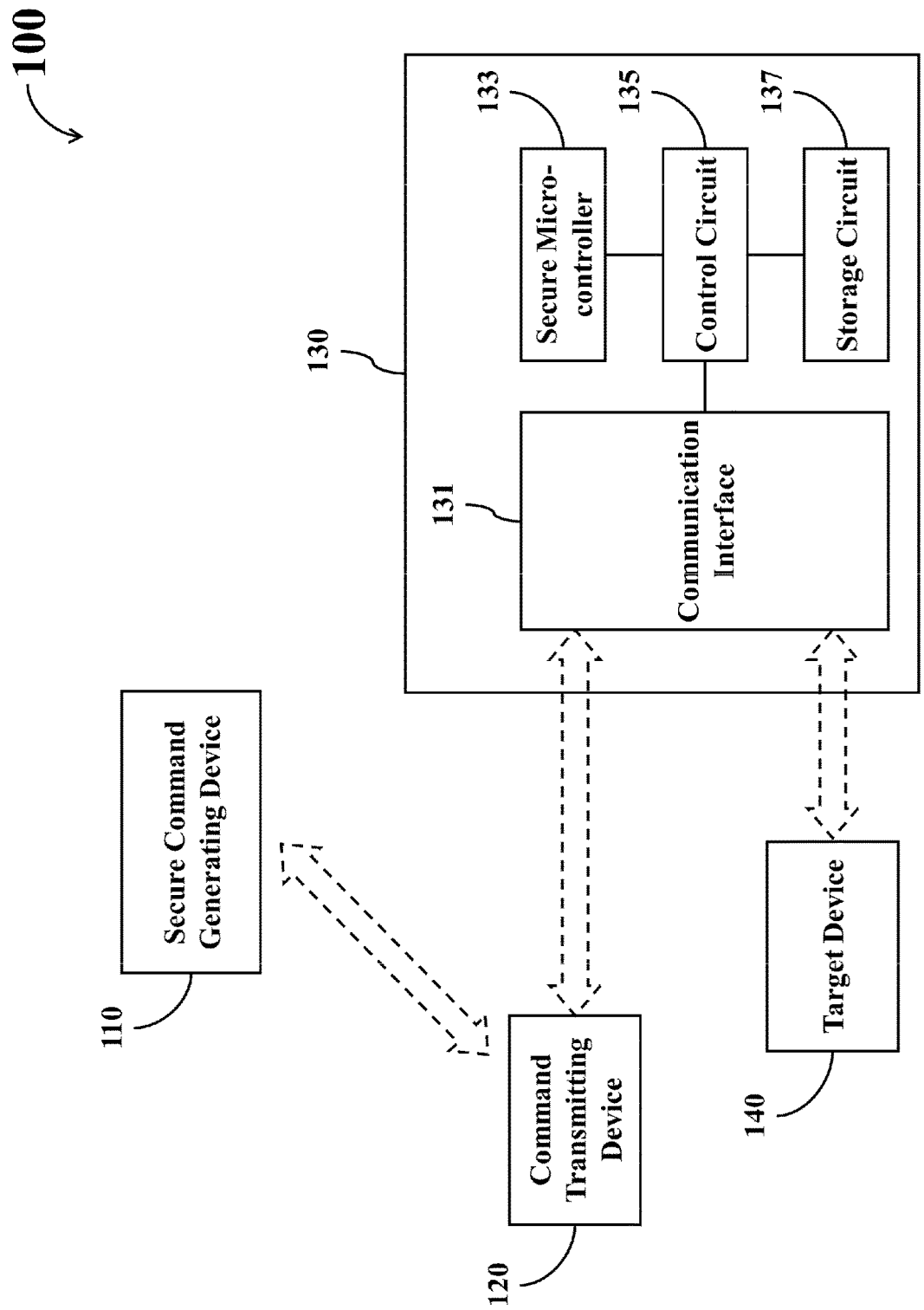
FIG. 1 shows a simplified functional block diagram of a forged command filtering system according to one embodiment of the present disclosure.

FIG. 1 shows a simplified functional block diagram of a forged command filtering system 100 according to one embodiment of the present disclosure. The forged command filtering system 100 comprises a secure command generating device 110, a command transmitting device 120, a command authentication circuit 130, and a target device 140 to be controlled.

In some embodiments, the secure command generating device 110 and the command transmitting device 120 may communicate data with each other through Internet. In other embodiments, the secure command generating device 110 and the command transmitting device 120 may communicate data with each other through other wired transmission or wireless transmission approaches, or may be integrated into a single hardware device, such as a smart phone or a computer.

In some embodiments, the command transmitting device 120 and the command authentication circuit 130 may communicate data with each other through Internet. In other embodiments, the command transmitting device 120 and the command authentication circuit 130 may communicate data with each other through other wired transmission or wireless transmission approaches, or may be coupled with each other.

In some embodiments, the command transmitting device 120 and the target device 140 may be two separate devices. In other embodiments, the command transmitting device 120 and the target device 140 may be different functional circuits arranged in the same device.

In the forged command filtering system 100, the secure command generating device 110 is arranged to operably perform a digital signature operation on a selected command to be executed by the target device 140, so as to generate a corresponding command request. Then, the secure command generating device 110 transmits the command request to the command authentication circuit 130 through the command transmitting device 120 or the target device 140. The command authentication circuit 130 is arranged to operably authenticate the command request to ensure the reality of the command to be transmitted to and executed by the target device 140, thereby avoiding the adverse consequence that caused by the target device 140 when executing forged command. Accordingly, the command authentication circuit 130 may be coupled with the control terminal of the target device 140 or arranged on the signal control path directed to the target device 140.

As shown in FIG. 1, the command authentication circuit 130 comprises a communication interface 131, a secure micro-controller 133, a control circuit 135, and storage circuit 137. The communication interface 131 is arranged to operably communicate with the command transmitting device 120 or the target device 140. The secure micro-controller 133 is arranged to operably store the signature verification key of the secure command generating device 110, and to operably conduct related digital signature algorithm operations. The control circuit 135 is coupled with the communication interface 131 and the secure micro-controller 133. The control circuit 135 is arranged to operably communicate with the command transmitting device 120 or the target device 140 through the communication interface 131, and to operably cooperate with the secure micro-controller 133 to authenticate received command request using the signature verification key. The control circuit 135 would instruct the target device 140 to execute a target command corresponding to the command request only if the command request passed authentication processes conducted by the secure micro-controller 133 and the control circuit 135. The storage circuit 137 is coupled with the control circuit 135, and arranged to operably store data required for operations of the control circuit 135.

In the command authentication circuit 130, a dedicated secured data channel may be arranged between the secure micro-controller 133 and the control circuit 135 for use in transmitting secret data or sensitive data.

In practice, the communication interface 131 may be realized with various signal interface circuits complying with related network communication specifications, wired communication specifications, or wireless communication specifications. For example, depending on the communication approach to be employed to communicate with the command transmitting device 120 and/or the target device 140, the communication interface 131 may comprise a USB (Universal Serial Bus) interface, a UART (Universal Asynchronous Receiver/Transmitter) interface, a SATA (Serial Advanced Technology Attachment) interface, a PCI (Peripheral Component Interconnect) interface, a PCI-E (Peripheral Component Interconnect Express) interface, a SDIO (Secure digital input/output interface) interface, a SPI (Serial Peripheral Interface) interface, a smart card (ISO7816) interface, a NIC (Network Interface Card) interface, a Wi-Fi interface, a Bluetooth interface, a BLE (Bluetooth Low Energy) interface, a NFC (Near Field Communication) interface, or a combination of two or more of aforementioned interfaces.

Alternatively, in some embodiments where the command transmitting device 120 is equipped with signal interface circuits complying with aforementioned network communication specifications, wired communication specifications, or wireless communication specifications, the command authentication circuit 130 may utilize the communication ability of the command transmitting device 120 to indirectly communicate with the secure command generating device 110 and/or the target device 140. In this situation, the communication interface 131 may be simply realized with data transmission circuits, transmission pins, or a transmission bus.

Similarly, in some embodiments where the target device 140 is equipped with signal interface circuits complying with aforementioned network communication specifications, wired communication specifications, or wireless communication specifications, the command authentication circuit 130 may utilize the communication ability of the target device 140 to indirectly communicate with the command transmitting device 120. In this situation, the communication interface 131 may be simply realized with data transmission circuits, transmission pins, or a transmission bus.

In addition, the secure micro-controller 133 may be realized with various micro-controllers capable of performing cryptographic algorithm computations, conducting key generation and related operations, conducting digital signature algorithm operations, and storing secret/sensitive data. For example, the secure micro-controller 133 may be realized with various micro-controllers having international data security certificate to ensure the security of the key and sensitive data stored therein. The control circuit 135 may be realized with an appropriate programmable micro-processor capable of conducting operations and parsing commands.

Figure 2:
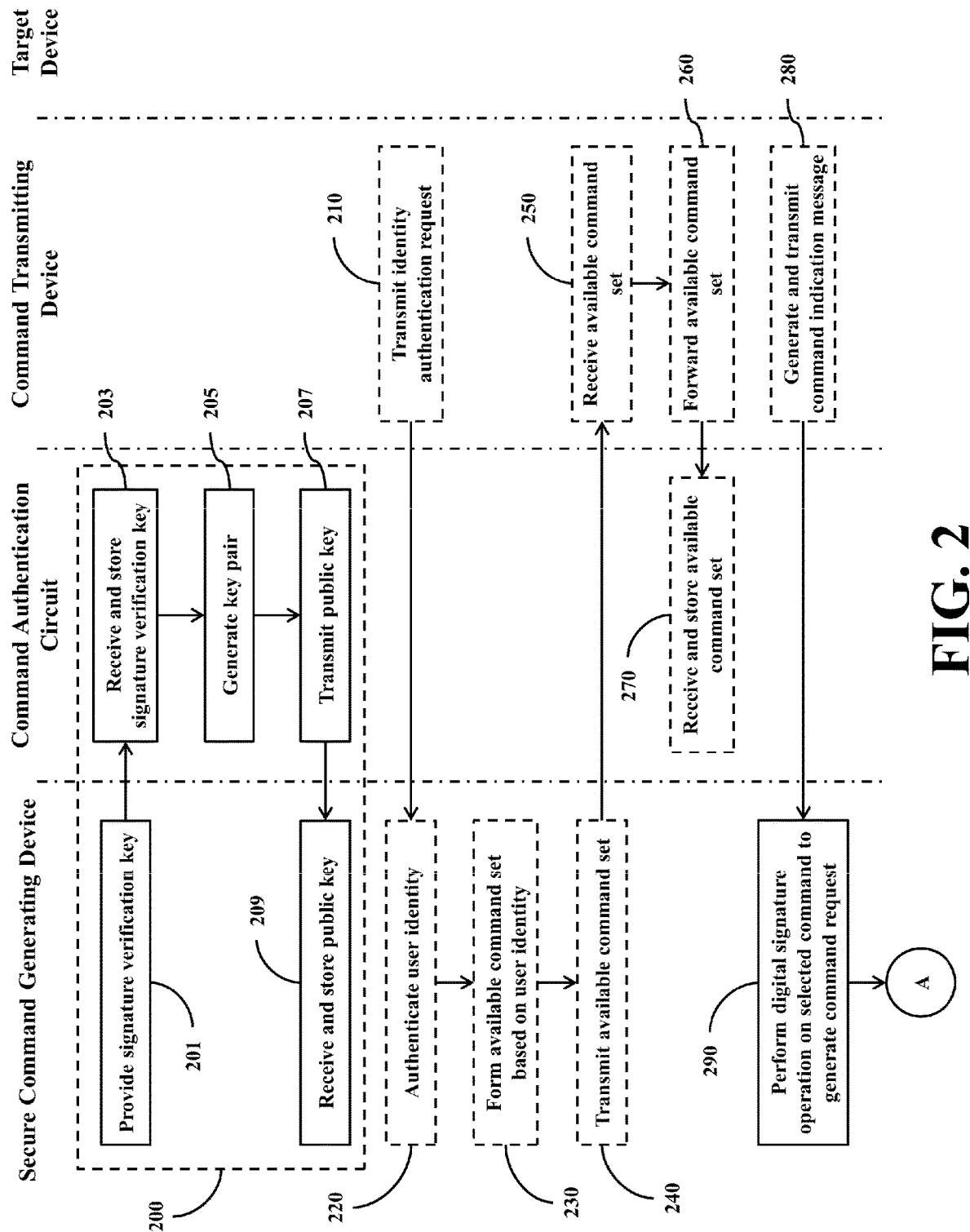
FIGS. 2~3 collectively show a simplified flowchart illustrating a forged command filtering method according to one embodiment of the present disclosure.
Figure 3:
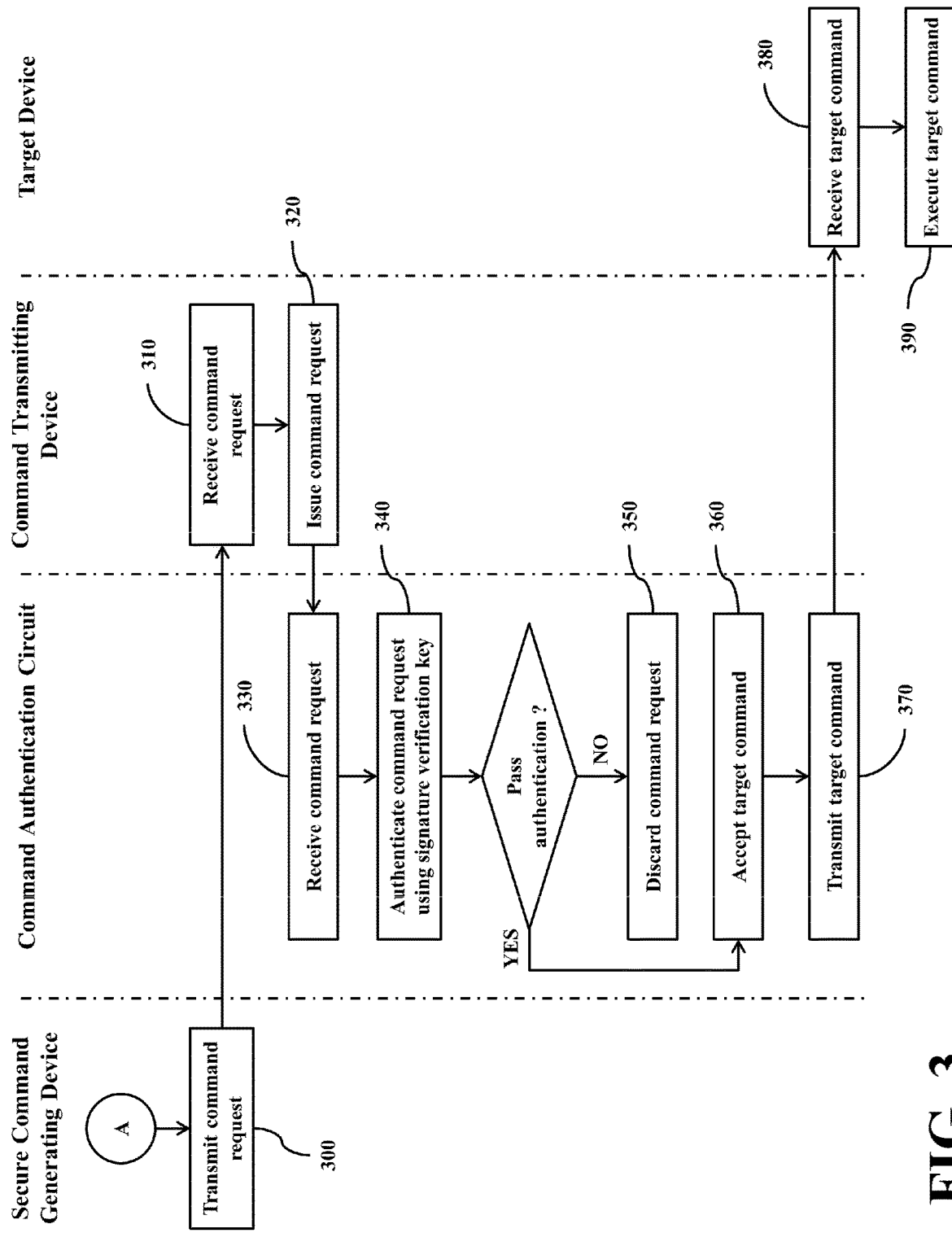

The operations of the forged command filtering system 100 will be further described in the following by reference to FIG. 2 and FIG. 3. FIGS. 2~3 collectively show a simplified flowchart illustrating a forged command filtering method according to one embodiment of the present disclosure.

In FIGS. 2~3, operations within a column under the name of a specific device are operations to be performed by the specific device. For example, operations within a column under the label "secure command generating device" are operations to be performed by the secure command generating device 110, operations within a column under the label "command transmitting device" are operations to be performed by the command transmitting device 120, operations within a column under the label "command authentication circuit" are operations to be performed by the command authentication circuit 130, operations within a column under the label "target device" are operations to be performed by the target device 140, and so forth. The same analogous arrangement also applies to the subsequent flowcharts.

In order to effectively filter out forged commands in normal operations, the secure command generating device 110 and the command authentication circuit 130 of the forged command filtering system 100 perform the operation 200 of FIG. 2 to establish a hardware pairing relationship between the secure command generating device 110 and the command authentication circuit 130.

For example, the secure command generating device 110 may first perform the operation 201 to provide the signature verification key of the secure command generating device 110 to the command authentication circuit 130. In practice, the secure command generating device 110 and the command authentication circuit 130 may establish a secure connection through encrypted transmission in the operation 201, and then the secure command generating device 110 may transmit the signature verification key to the command authentication circuit 130 through the secure connection.

Then, the command authentication circuit 130 may perform the operation 203 to receive and store the signature verification key transmitted from the secure command generating device 110. In the operation 203, the command authentication circuit 130 may utilize the communication interface 131 to receive the signature verification key transmitted from the secure command generating device 110. The control circuit 135 of the command authentication circuit 130 may transmit the aforementioned signature verification key to the secure micro-controller 133 for storage through the secured data channel between the secure micro-controller 133 and the control circuit 135.

Please note that in the aforementioned operations 201 and 203, the command authentication circuit 130 may be directly connected or coupled to the secure command generating device 110 to establish the aforementioned secure connection. Alternatively, the command authentication circuit 130 may be coupled with an intermediate device (such as a trustable computer) that has no security concern and capable of communicating with the secure command generating device 110, and then establish the aforementioned secure connection with the secure command generating device 110 through the intermediate device.

In the operation 205, the secure micro-controller 133 of the command authentication circuit 130 generates a key pair. The secure micro-controller 133 stores the private key of the key pair in an internal secret/sensitive data storage space of the secure micro-controller 133, and transmits the public key of the key pair to the control circuit 135 through the secured data channel between the secure micro-controller 133 and the control circuit 135.

In the operation 207, the control circuit 135 transmits the public key of the key pair to the secure command generating device 110 through the communication interface 131.

In the operation 209, the secure command generating device 110 receives and stores the public key transmitted from the command authentication circuit 130.

It can be appreciated from the foregoing descriptions that when the hardware pairing procedure between the secure command generating device 110 and the command authentication circuit 130 in the operation 200 is completed, the secure command generating device 110 is stored with the public key of the key pair generated by the command authentication circuit 130, and the secure micro-controller 133 of the command authentication circuit 130 is stored with the signature verification key of the secure command generating device 110.

In some embodiments, the commands can be executed by the target device 140 are relevant to the identity of the user of the command transmitting device 120. Accordingly, the forged command filtering system 100 may conduct a user identity authentication operation to verify the command authority level of the user of the command transmitting device 120.

In this situation, when a user identification data is received by the command transmitting device 120, the command transmitting device 120 may perform the operation 210 to transmit an identity authentication request to the secure command generating device 110.

When the identity authentication request is received by the secure command generating device 110, the secure command generating device 110 may perform the operation 220 to authenticate the user identity to verify the command authority level of the user.

If the user identification data does not pass the identity authentication operation, the secure command generating device 110 determines that the user is not a valid user, and would refuse to generate corresponding commands based on the user request so as to block out invalid user manipulation.

If the user identification data passed the identity authentication operation, the secure command generating device 110 may perform the operation 230 to select eligible commands matching with the user's authority level (i.e., one or more commands that the user has authority to access) based on the user identity to form an available command set.

Then, the secure command generating device 110 may perform the operation 240 to transmit the available command set to the command transmitting device 120 and instruct the command transmitting device 120 to forward the available command set to the command authentication circuit 130.

In the operation 250, the command transmitting device 120 receives the available command set transmitted from the secure command generating device 110.

In the operation 260, the command transmitting device 120 forwards the received available command set to the command authentication circuit 130.

In the operation 270, the command authentication circuit 130 may utilize the communication interface 131 to receive the available command set transmitted from the command transmitting device 120, and the control circuit 135 stores the received available command set in the storage circuit 137.

In this embodiment, when the user would like the target device 140 to execute a specific command, the user may manipulate related input interface (such as touch screen, keyboard, mouse, microphone, camera, or the like) of the command transmitting device 120 to select a specific command. In this situation, the command transmitting device 120 performs the operation 280 to generate a command indication message corresponding to the selected command according to the user's manipulation, and transmits the command indication message to the secure command generating device 110.

When received the command indication message transmitted from the command transmitting device 120, the secure command generating device 110 may perform the operation 290.

In the operation 290, the secure command generating device 110 may perform a digital signature operation on the selected command using the signature key of the secure command generating device 110 to generate a corresponding command request.

Then, the secure command generating device 110 may perform the operation 300 of FIG. 3 to transmit the command request to the command transmitting device 120.

In the operation 310, the command transmitting device 120 receives the command request transmitted from the secure command generating device 110.

Then, the command transmitting device 120 may perform the operation 320 to issue the received command request to the command authentication circuit 130.

In the operation 330, the command authentication circuit 130 may utilize the communication interface 131 to receive the command request transmitted from the command transmitting device 120.

In the operation 340, the control circuit 135 of the command authentication circuit 130 cooperates with the secure micro-controller 133 to authenticate the reality and correctness of the received command request using the aforementioned signature verification key.

If the command request fails to pass (i.e., does not pass) the authentication processes conducted by the secure micro-controller 133 or the control circuit 135, the control circuit 135 would determine that the command request is a forged command request. In this situation, the control circuit 135 performs the operation 350 to discard the command request.

On the contrary, if the command request passed the authentication processes conducted by the secure micro-controller 133 and the control circuit 135, the control circuit 135 performs the operation 360 to accept a target command corresponding to the command request as an authenticated command.

Then, the control circuit 135 may perform the operation 370 to transmit the target command to the target device 140 through the communication interface 131.

In the operation 380, the target device 140 receives the target command transmitted from the command authentication circuit 130.

Then, the target device 140 performs the operation 390 to execute the received target command.

In other words, the control circuit 135 would instruct the target device 140 to execute the target command corresponding to the command request only if the command request passed the authentication processes conducted by the secure micro-controller 133 and the control circuit 135.

In the forged command filtering system 100, only the commands generated by the secure command generating device 110 using the signature of the secure command generating device 110 can pass the authentication processes conducted by the secure micro-controller 133 and the control circuit 135. Other commands that were not generated by the secure command generating device 110 using the signature of the secure command generating device 110 would be determined as forged commands by the secure micro-controller 133 or the control circuit 135.

Figure 4:
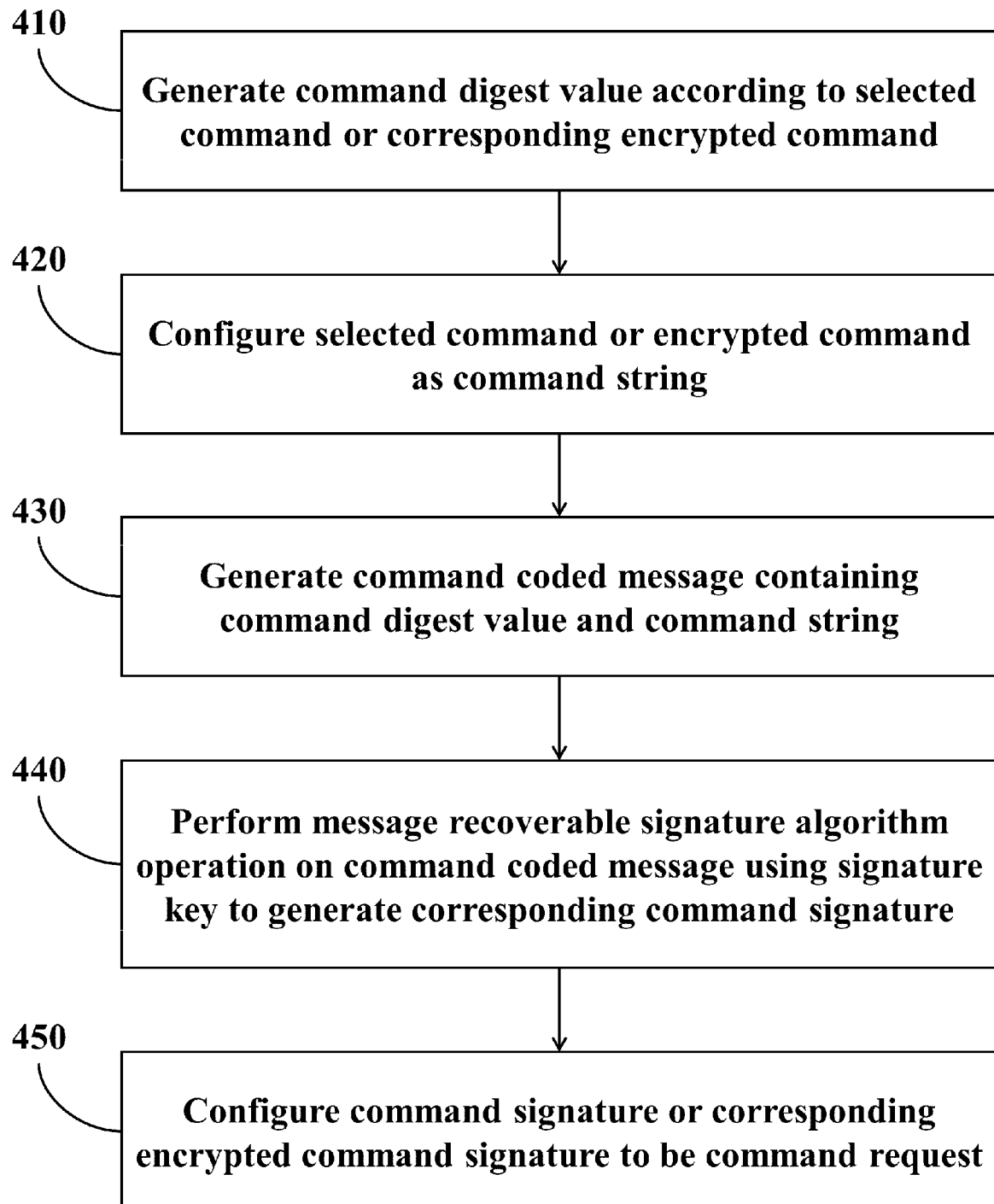
FIG. 4 shows a simplified flowchart illustrating a method for generating a command request according to one embodiment of the present disclosure.

Please refer to FIG. 4, which shows a simplified flowchart illustrating a method for generating a command request according to one embodiment of the present disclosure. The secure command generating device 110 may adopt the method of FIG. 4 in the aforementioned operation 290 to generate the command request.

In the operation 410, the secure command generating device 110 may generate a corresponding digest value (hereinafter, referred to as a command digest value) according to the selected command. For example, the secure command generating device 110 may perform a Hash algorithm operation on the selected command to generate the command digest value. Alternatively, the secure command generating device 110 may first encrypt the selected command using other encryption key or the public key of the command authentication circuit 130 to generate a corresponding encrypted command, and then perform the Hash algorithm operation on the encrypted command to generate the command digest value. In other words, the command digest value may be generated based on the plaintext of the selected command or generated based on the ciphertext of the selected command.

In the operation 420, the secure command generating device 110 may configure the selected command or the encrypted command as a command string.

In the operation 430, the secure command generating device 110 may generate a coded message (hereinafter, referred to as a command coded message) containing the command digest value and the command string, while configure the command string as a padding string in the command coded message. Accordingly, the padding string in the command coded message is recorded with the plaintext or ciphertext of the selected command. In practice, the secure command generating device 110 may also record the object identification code and/or other related data of the Hash algorithm in the command coded message.

In the operation 440, the secure command generating device 110 may perform a message recoverable signature algorithm operation on the command coded message using the signature key of the secure command generating device 110 to generate a corresponding signature (hereinafter, referred to as a command signature).

Then, the secure command generating device 110 may perform the operation 450 to generate the aforementioned command request based on the command signature. For example, the secure command generating device 110 may simply configure the command signature to be the aforementioned command request. Alternatively, the secure command generating device 110 may first encrypt the command signature using other encryption key or the public key of the command authentication circuit 130 to generate a corresponding encrypted version (hereinafter, referred to as an encrypted command signature), and then configure the encrypted command signature to be the aforementioned command request. In other words, the command request may be generated based on the plaintext of the command signature or generated based on the ciphertext of the command signature.

If the data length of the command string exceeds the padding string length of a single command coded message, the secure command generating device 110 may segment the content of the command string into multiple command coded messages and generate multiple corresponding command requests.

It can be appreciated from the foregoing descriptions that the command request generated by the secure command generating device 110 has been recorded with the content of the selected command or its encrypted version. Accordingly, when the command request is received by a valid receiving device, the receiving device is enabled to restore the selected command from the command request by performing a corresponding message recoverable signature algorithm operation on the command request. As a result, the secure command generating device 110 only needs to transmit the command request to related receiving devices, and does not need to additionally transmit the selected command or its encrypted version to the receiving devices.

Figure 5:
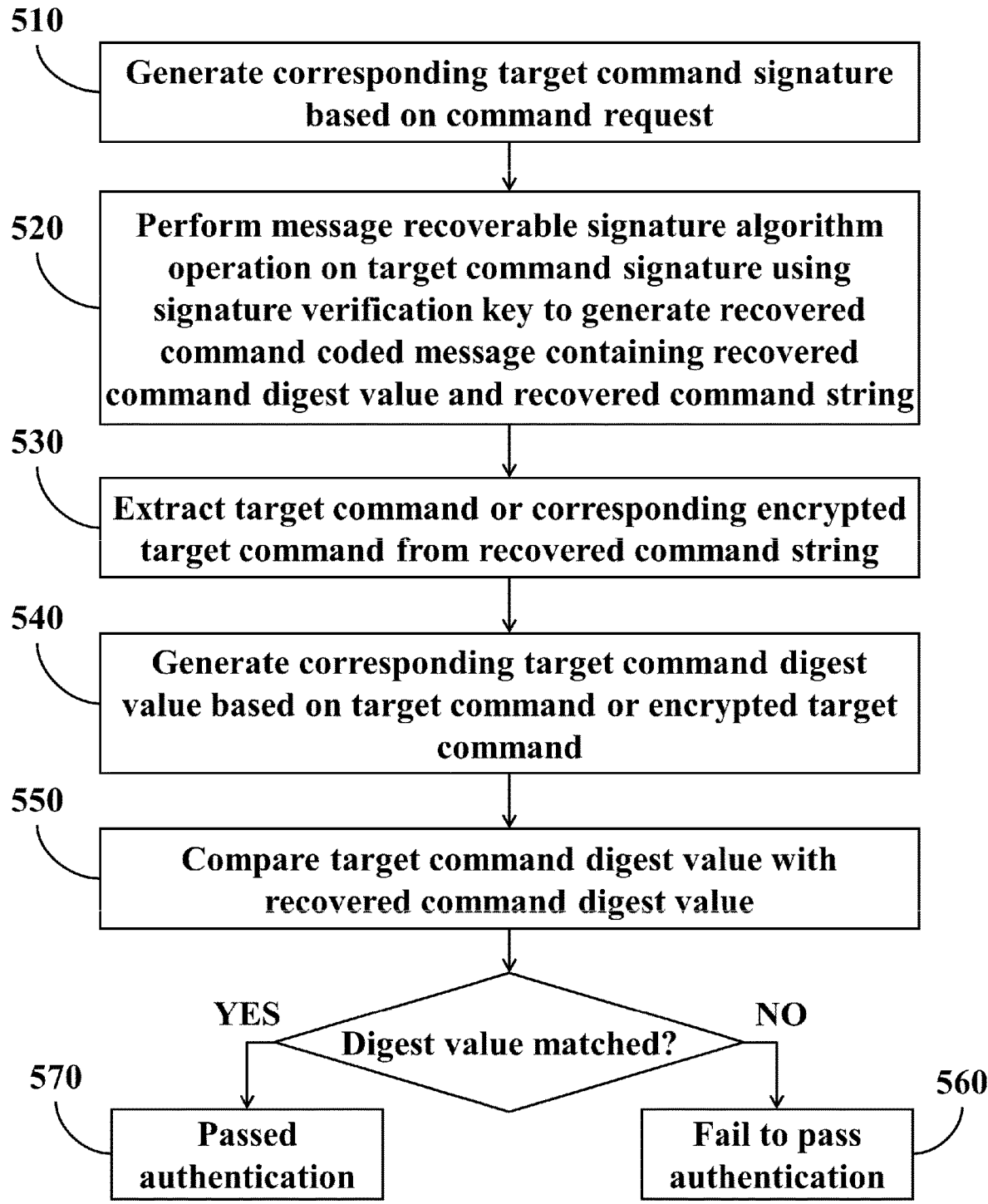
FIG. 5 shows a simplified flowchart illustrating a method for authenticating a command request according to one embodiment of the present disclosure.

Please refer to FIG. 5, which shows a simplified flowchart illustrating a method for authenticating a command request according to one embodiment of the present disclosure. The control circuit 135 and the secure micro-controller 133 may adopt the method of FIG. 5 in the aforementioned operation 340 to authenticate the reality and correctness of the command request.

In the operation 510, the control circuit 135 and/or the secure micro-controller 133 may generate a corresponding signature (hereinafter, referred to as a target command signature) based on the received command request.

For example, in the embodiments where the secure command generating device 110 configures the command signature to be the aforementioned command request, the control circuit 135 may simply retrieve the target command signature from the received command request.

For another example, in the embodiments where the secure command generating device 110 configures the encrypted command signature to be the aforementioned command request, the control circuit 135 may transmit the received command request to the secure micro-controller 133 through the secured data channel, and instruct the secure micro-controller 133 to decrypt the command request. The secure micro-controller 133 may decrypt the command request according to the instruction of the control circuit 135 by using a corresponding decryption key of the private key of the command authentication circuit 130.

If the secure micro-controller 133 fails to successfully decrypt (i.e., unable to decrypt) the command request, it means failure of the command request authentication process, and also means that the command request fails to pass (i.e., does not pass) the authentication processes conducted by the secure micro-controller 133. In this situation, the secure micro-controller 133 may actively inform the control circuit 135 of the failure of the command request authentication process. Alternatively, the control circuit 135 may independently determine that the command request fails to pass the authentication processes conducted by the secure micro-controller 133 if the secure micro-controller 133 cannot send a notice to the control circuit 135 within a predetermined length of time period, and thus the secure micro-controller 133 may not need to actively inform the control circuit 135 of the failure of the command request authentication process.

On the contrary, if the secure micro-controller 133 can successfully decrypt the command request, the secure micro-controller 133 generates the aforementioned target command signature, and transmits the target command signature to the control circuit 135 through the secured data channel. In other words, the target command signature may be independently generated by the control circuit 135, or may be generated by the cooperation of the control circuit 135 and the secure micro-controller 133.

After obtaining the target command signature, the control circuit 135 may instruct the secure micro-controller 133 to perform a digital signature algorithm operation on the target command signature. In this situation, the secure micro-controller 133 proceeds to the operation 520.

In the operation 520, the secure micro-controller 133 may perform a message recoverable signature algorithm operation on the target command signature using the aforementioned signature verification key based on the instruction of the control circuit 135. The message recoverable signature algorithm employed by the secure micro-controller 133 in the operation 520 corresponds to the message recoverable signature algorithm employed by the secure command generating device 110 in the aforementioned operation 440.

If the secure micro-controller 133 cannot successfully obtain the computing result of the message recoverable signature algorithm, it means failure of the command request authentication process, and also means that the command request fails to pass (i.e., does not pass) the authentication processes conducted by the secure micro-controller 133. In this situation, the secure micro-controller 133 may actively inform the control circuit 135 of the failure of the command request authentication process. Alternatively, the control circuit 135 may independently determine that the command request fails to pass the authentication processes conducted by the secure micro-controller 133 if the secure micro-controller 133 cannot send a notice to the control circuit 135 within a predetermined length of time period, and thus the secure micro-controller 133 may not need to actively inform the control circuit 135 of the failure of the command request authentication process.

On the contrary, if the secure micro-controller 133 can successfully obtain the computing result of the message recoverable signature algorithm, the secure micro-controller 133 generates a corresponding coded message (hereinafter, referred to as a recovered command coded message) corresponding to the target command signature, wherein the recovered command coded message contains a digest value (hereinafter, referred to as a recovered command digest value) and a padding string (hereinafter, referred to as a recovered command string).

In theory, if the target command signature is a real and correct signature rather than a forged signature, then the recovered command coded message generated by the secure micro-controller 133 in the operation 520 should be identical to the command coded message generated by the secure command generating device 110 in the operation 430, and the recovered command digest value and the recovered command string contained in the recovered command coded message should be respectively identical to the command digest value and the command string containing in the aforementioned command coded message.

The secure micro-controller 133 may transmit the resulting recovered command coded message to the control circuit 135 through the secured data channel.

In the operation 530, the control circuit 135 may extract the aforementioned target command from the recovered command string or extract an encrypted version of the target command (hereinafter, referred to as an encrypted target command) from the recovered command string.

If the data extracted from the recovered command string by the control circuit 135 is the encrypted target command, the control circuit 135 may transmit the encrypted target command to the secure micro-controller 133 through the secured data channel, and instruct the secure micro-controller 133 to decrypt the encrypted target command. The secure micro-controller 133 may decrypt the encrypted target command according to the instruction of the control circuit 135 by using a corresponding decryption key of the private key of the command authentication circuit 130.

If the secure micro-controller 133 fails to successfully decrypt (i.e., unable to decrypt) the encrypted target command, it means failure of the command request authentication process, and also means that the command request fails to pass (i.e., does not pass) the authentication processes conducted by the secure micro-controller 133. In this situation, the secure micro-controller 133 may actively inform the control circuit 135 of the failure of the command request authentication process. Alternatively, the control circuit 135 may independently determine that the command request fails to pass the authentication processes conducted by the secure micro-controller 133 if the secure micro-controller 133 cannot send a notice to the control circuit 135 within a predetermined length of time period, and thus the secure micro-controller 133 may not need to actively inform the control circuit 135 of the failure of the command request authentication process.

On the contrary, if the secure micro-controller 133 can successfully decrypt the encrypted target command, the secure micro-controller 133 generates the target command and transmits the target command to the control circuit 135 through the secured data channel.

In other words, the target command may be obtained from the recovered command string by the control circuit 135 alone, or may be generated by the cooperation of the control circuit 135 and the secure micro-controller 133.

In the operation 540, the control circuit 135 may generate a corresponding digest value (hereinafter, referred to as a target command digest value) based on the target command or the encrypted target command.

For example, in the embodiments where the secure command generating device 110 generates the aforementioned command digest value by performing the Hash algorithm operation on the encrypted command, the control circuit 135 may perform a corresponding Hash algorithm operation on the encrypted target command to generate the target command digest value.

For another example, in the embodiments where the secure command generating device 110 generates the aforementioned command digest value by performing the Hash algorithm operation on the selected command, the control circuit 135 may perform a corresponding Hash algorithm operation on the target command to generate the target command digest value.

In other words, the target command digest value may be generated based on the plaintext of the target command, or may be generated based on the ciphertext of the target command.

Then, the control circuit 135 may perform the operation 550 to compare the target command digest value with the recovered command digest value. In theory, if the target command or the encrypted target command is real data rather than forged data, then the target command digest value generated by the control circuit 135 should match with (i.e., should be identical to) the recovered command digest value in the recovered command coded message generated by the secure micro-controller 133.

If the target command digest value does not identical to the recovered command digest value, it means failure of the command request authentication process, and also means that the command request fails to pass (i.e., does not pass) the authentication processes conducted by the control circuit 135.

On the contrary, if the target command digest value is identical to the recovered command digest value, it means that the command request passed the authentication processes conducted by the secure micro-controller 133 and the control circuit 135. In this situation, the control circuit 135 may proceed to the operation 360 to accept the target command as an authenticated command.

In some embodiments, the control circuit 135 may further check whether the target command is one of the eligible commands defined the in aforementioned available command set so as to determine whether the target command exceeds the authority level of the user. For example, if the target command is not an eligible command defined the in aforementioned available command set, the control circuit 135 would determine that the target command exceeds the user's authority level. In this situation, the control circuit 135 would discard the target command to prevent the target device 140 from executing a command which exceeds the user's authority level. In this embodiment, the control circuit 135 would perform the operation 370 to transmit the target command to the target device 140 through the communication interface 131 only if the command request can pass the authentication processes conducted by the secure micro-controller 133 and the control circuit 135, while the target command is one of the eligible commands defined the in aforementioned available command set.

In practice, the control circuit 135 may conduct the operation of checking whether the target command is one of the eligible commands defined the in aforementioned available command set before the operation 540 or 550, or after the operation 570.

Please note that in the previous embodiments, the command transmitting device 120 directly transmits the received command request to the command authentication circuit 130. But this is merely an exemplary embodiment, rather than a restriction to the practical implementations.

Figure 6:
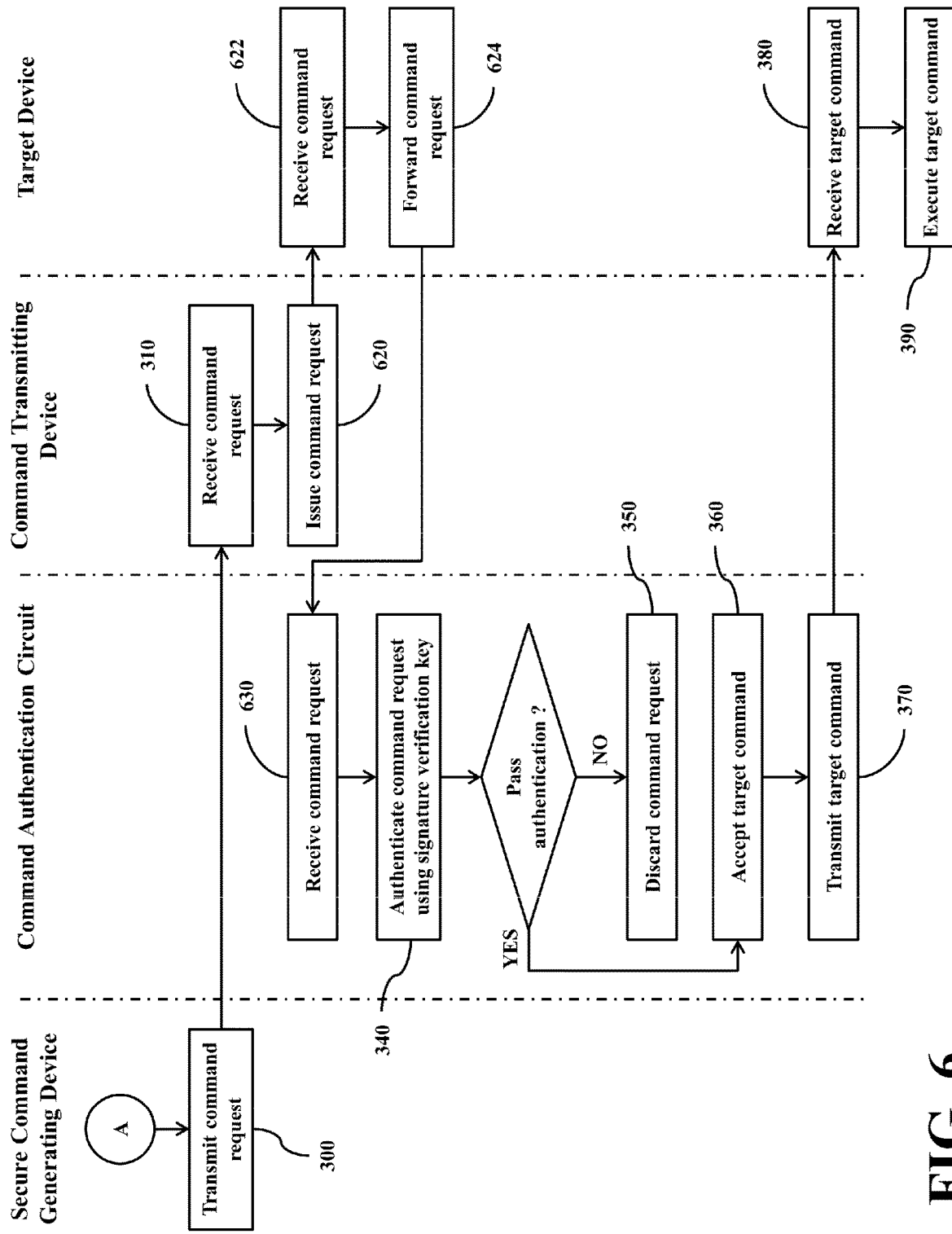
FIG. 6 shows a simplified flowchart illustrating partial operations of a forged command filtering method according to another embodiment of the present disclosure.

For example, FIG. 6 shows a simplified flowchart illustrating partial operations of a forged command filtering method according to another embodiment of the present disclosure. In the embodiment of FIG. 6, when the command transmitting device 120 received the command request transmitted from the secure command generating device 110 in operation 310, the command transmitting device 120 performs the operation 620 to issue the received command request to the target device 140, instead of the command authentication circuit 130.

In the operation 622, the target device 140 receives the command request transmitted from the command transmitting device 120.

Then, the target device 140 would not execute the command in the command request transmitted from the command transmitting device 120. Instead, the target device 140 performs the operation 624 to further transmit the command request to the command authentication circuit 130 for authentication.

In the operation 630, the command authentication circuit 130 may utilize the communication interface 131 to receive the command request transmitted from the target device 140.

The following operations 340 through 390 in FIG. 6 are respectively the same as the corresponding operations in FIG. 3. For the sake of brevity, those descriptions will not be repeated here.

That is, in the embodiment of FIG. 6, the command transmitting device 120 indirectly transmits the command request to the command authentication circuit 130 through the target device 140, instead of directly transmits the command request to the command authentication circuit 130.

In the aforementioned operation 440, the signature algorithm employed by the secure command generating device 110 in generating the command signature is a message recoverable signature algorithm. But this is merely an exemplary embodiment, rather than a restriction to the practical implementations.

In practice, the signature algorithm employed by the secure command generating device 110 in generating the command signature may be other signature algorithm than the message recoverable signature algorithm. In this situation, the selected command or the corresponding encrypted command would not be recorded in the padding string of the command coded message. Therefore, the secure command generating device 110 has to additionally transmit the selected command or the encrypted command to the command transmitting device 120. Similar with the embodiments of FIG. 3 or FIG. 6, the command transmitting device 120 may directly transmit the selected command or the encrypted command transmitted from the secure command generating device 110 to the command authentication circuit 130, or may indirectly transmit the selected command or the encrypted command to the command authentication circuit 130 through the target device 140. The command authentication circuit 130 may utilize the communication interface 131 to receive the command (i.e., the aforementioned target command) or the encrypted version of the command (i.e., the aforementioned encrypted target command) transmitted from the command transmitting device 120 or the target device 140.

When authenticating the command request, the control circuit 135 and/or the secure micro-controller 133 may perform the aforementioned operation 510 to generate a signature (also referred to as a target command signature) corresponding to the received command request.

As described previously, in the embodiments where the secure command generating device 110 configures the encrypted command signature to be the command request, the control circuit 135 may transmit the received command request to the secure micro-controller 133 through the secured data channel, and instruct the secure micro-controller 133 to decrypt the command request. The secure micro-controller 133 may decrypt the command request according to the instruction of the control circuit 135 by using a corresponding decryption key of the private key of the command authentication circuit 130.

If the secure micro-controller 133 fails to successfully decrypt (i.e., unable to decrypt) the command request, it means failure of the command request authentication process, and also means that the command request fails to pass (i.e., does not pass) the authentication processes conducted by the secure micro-controller 133.

On the contrary, if the secure micro-controller 133 can successfully decrypt the command request, the secure micro-controller 133 generates the aforementioned target command signature, and transmits the target command signature to the control circuit 135 through the secured data channel. In other words, the target command signature may be independently generated by the control circuit 135, or may be generated by the cooperation of the control circuit 135 and the secure micro-controller 133.

After obtaining the target command signature, the control circuit 135 may instruct the secure micro-controller 133 to conduct a digital signature algorithm operation on the target command signature.

In this embodiment, the secure micro-controller 133 may perform a digital signature algorithm operation on the target command signature according to the instruction of the control circuit 135 by using the aforementioned signature verification key to generate a digest (also referred to as a recovered command digest value). The signature algorithm employed by the secure micro-controller 133 in this situation corresponds to the signature algorithm employed by the secure command generating device 110 in generating the command signature.

If the secure micro-controller 133 fails to successfully generate (i.e., unable to generate) the recovered command digest value, it means failure of the command request authentication process, and also means that the command request fails to pass (i.e., does not pass) the authentication processes conducted by the secure micro-controller 133.

If the data received by the communication interface 131 is the encrypted target command, the control circuit 135 may transmit the encrypted target command to the secure micro-controller 133 through the secured data channel and instruct the secure micro-controller 133 to decrypt the encrypted target command. The secure micro-controller 133 may decrypt the encrypted target command according to the instruction of the control circuit 135 by using a corresponding decryption key or the private key of the command authentication circuit 130. If the secure micro-controller 133 fails to successfully decrypt (i.e., unable to decrypt) the encrypted target command, it means failure of the command request authentication process, and also means that the command request fails to pass (i.e., does not pass) the authentication processes conducted by the secure micro-controller 133.

Similar with the aforementioned operations 540 and 550, the control circuit 135 may generate a corresponding target command digest value based on the target command or the encrypted target command, and compare the recovered command digest value generated by the secure micro-controller 133 with the target command digest value. If the target command digest value is not identical to the recovered command digest value, it means that the command request fails to pass (i.e., does not pass) the authentication processes conducted by the control circuit 135.

It can be appreciated from the foregoing descriptions, the target command corresponding to the command request received by the command authentication circuit 130 would be accepted as an authenticated command by the control circuit 135 (i.e., be determined as a secure command) only if the command request can pass the authentication processes conducted by the secure micro-controller 133 and the control circuit 135. Other commands that lack the signature of the secure command generating device 110 or unable to be successfully decrypted by the secure micro-controller 133 would be filtered out by the command authentication circuit 130, and thus will not be executed by the target device 140.

Additionally, the control circuit 135 in the previous embodiment may further compare the target command with the available command set to determine whether the command issued by the user exceeds the user's authority level or not. Any command that exceeds the user's authority level would be filtered out by the command authentication circuit 130 and thus will not be executed by the target device 140.

Accordingly, even malicious program codes or intruders has hacked into the communication process between the command transmitting device 120 and the command authentication circuit 130, the forged commands generated by the malicious program codes or intruders would be effectively filtered out by the command authentication circuit 130 and will not be executed by the target device 140 for the reason that these forged commands are not generated by using the signature of the secure command generating device 110.

As a result, the reality of the command to be executed by the target device 140 can be guaranteed, thereby effectively preventing forged commands from being executed by the target device 140. In other words, the forged command filtering system 100 described previously is enabled to effectively prevent the target device 140 from being manipulated by forged commands.

In addition, since the signature verification key of the secure command generating device 110 is stored in the secure micro-controller 133 of the command authentication circuit 130, it can be ensured that the signature verification key will not be maliciously changed, and thus the strictness and correctness of the information security verification process can be improved.

Moreover, the aforementioned command authentication circuit 130 automatically conducts the previous command request authentication operations without user intervention, and thus has the merit of great operating convenience.

The aforementioned target device 140 may perform various operations or computations to realize different functionality according to the received command. In addition, the implementations of the secure command generating device 110 and the target device 140 may be different depending upon the practical applications of the forged command filtering system 100.

For example, if the forged command filtering system 100 is applied in a smart lock system, the secure command generating device 110 may be realized with a mobile device (e.g., a smart phone or a tablet computer), and the target device 140 may be realized with a lock control circuit within the smart lock.

For another example, if the forged command filtering system 100 is applied in a remote surveillance system, the secure command generating device 110 may be realized with a mobile device (e.g., a smart phone or a tablet computer), and the target device 140 may be realized with a video/audio signal accessing circuit or a control circuit of a remote camera of the remote surveillance system.

For another example, if the forged command filtering system 100 is applied in a NAS (network attached storage) accessing device, the secure command generating device 110 may be realized with a local server or a remote server for use in controlling the data accessing authority, and the target device 140 may be realized with an accessing control circuit of the NAS device.

For another example, if the forged command filtering system 100 is applied in an IoT (Internet of things) system, the secure command generating device 110 may be realized with a remote server of a specific IoT application service provider, and the target device 140 may be realized with a switch circuit or a control circuit of a certain IoT device in the IoT system.

For another example, if the forged command filtering system 100 is applied in an Industry 4.0 smart manufacturing system, the secure command generating device 110 may be realized with a central control server of the smart manufacturing system, and the target device 140 may be realized with a switch circuit or a control circuit of a certain manufacturing equipment in the smart manufacturing system.

Please note that if the forged command filtering system 100 is applied in some environments where no user intervention is required, the operations 210 through 280 in FIG. 2 may be omitted. In addition, the operations 205 through 209 may be omitted in some embodiments to simplify the complexity in the hardware pairing operation 200.

Additionally, in some applications where the information security concern is low, the secure micro-controller 133 and the control circuit 135 may transmit the aforementioned command request, target command signature, recovered command coded message, encrypted target command, and/or target command through other general data channel instead of the secured data channel.

Figure 7:
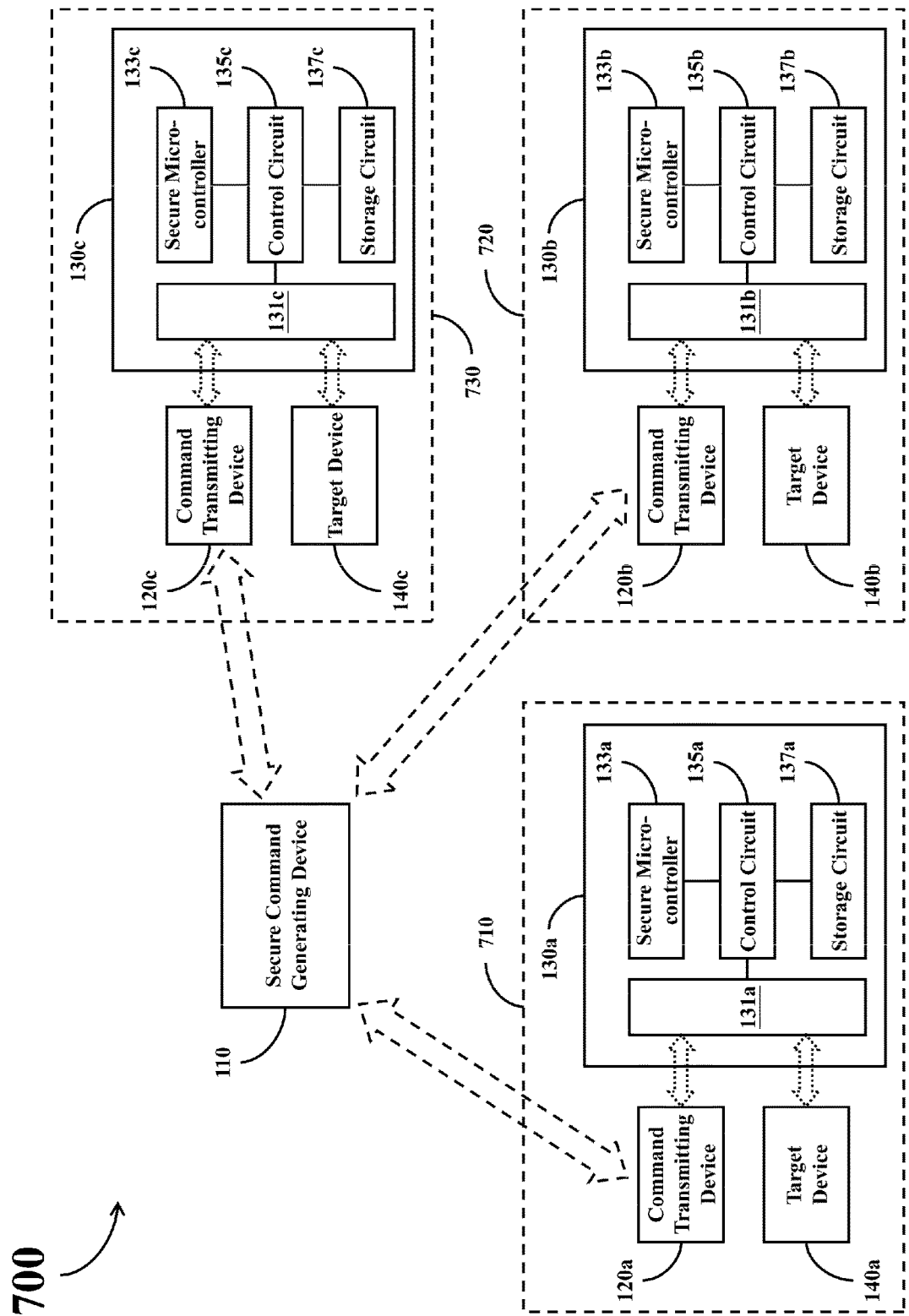
FIG. 7 shows a simplified functional block diagram of a collaborative operating system according to one embodiment of the present disclosure.

Please refer to FIG. 7, which shows a simplified functional block diagram of a collaborative operating system 700 according to one embodiment of the present disclosure. The collaborative operating system 700 is an embodiment where the structure of the aforementioned forged command filtering system 100 is applied in a mart manufacturing system or an IoT system.

As shown in FIG. 7, the collaborative operating system 700 comprises the secure command generating device 110 and multiple device groups. In the collaborative operating system 700, the structure and operations of each device group are similar with the combination of the command transmitting device 120, the command authentication circuit 130, and the target device 140 in the forged command filtering system 100 described previously, but a device group in a later stage would conduct operations based on the operating result of another device group in a prior stage to together accomplish a specific collaborative operation.

For the purpose of explanatory convenience in the following description, only three device groups (i.e., a first device group 710, a second device group 720, and a third device group 730) are shown in FIG. 7. The first device group 710 comprises a first command transmitting device 120a, a first command authentication circuit 130a, and a first target device 140a. The second device group 720 comprises a second command transmitting device 120b, a second command authentication circuit 130b, and a second target device 140b. The third device group 730 comprises a third command transmitting device 120c, a third command authentication circuit 130c, and a third target device 140c.

In the collaborative operating system 700, the secure command generating device 110 is arranged to operably generate multiple collaborative operation commands respectively corresponding to the device groups 710 through 730, and to operably instruct a device group in a later stage to perform operation based on the operating result of another device group in a prior stage to together accomplish a specific collaborative operation.

For illustrative purpose, it is assumed hereinafter that the secure command generating device 110 is arranged to operably generate and utilize a first-station command to control the operation of the first device group 710, to operably generate and utilize a second-station command to control the operation of the second device group 720, and to operably generate and utilize a third-station command to control the operation of the third device group 730. Similar with the previous embodiments, the secure command generating device 110 may perform a digital signature operation on the first-station command to generate a first-station command request. The secure command generating device 110 may perform a digital signature operation on the second-station command to generate a second-station command request. The secure command generating device 110 may perform a digital signature operation on the third-station command to generate a third-station command request.

As shown in FIG. 7, the first command authentication circuit 130a comprises a first communication interface 131a, a first secure micro-controller 133a, a first control circuit 135a, and a first storage circuit 137a. The first communication interface 131a is arranged to operably communicate with the first command transmitting device 120a or the first target device 140a, and to operably receive the first-station command request. The first secure micro-controller 133a is arranged to operably store a signature verification key of the secure command generating device 110. The first control circuit 135a is coupled with the first communication interface 131a and the first secure micro-controller 133a, and arranged to operably communicate with the first command transmitting device 120a or the first target device 140a through the first communication interface 131a. The first control circuit 135a is also arranged to operably cooperate with the first secure micro-controller 133a to authenticate the first-station command request using the signature verification key. The first storage circuit 137a is coupled with the first control circuit 135a, and arranged to operably store data required for the operation of the first control circuit 135a. The first control circuit 135a instructs the first target device 140a to execute a first target command corresponding to the first-station command request only if the first-station command request can pass the authentication processes conducted by the first secure micro-controller 133a and the first control circuit 135a.

The second command authentication circuit 130b comprises a second communication interface 131b, a second secure micro-controller 133b, a second control circuit 135b, and a second storage circuit 137b. The second communication interface 131b is arranged to operably communicate with the second command transmitting device 120b or the second target device 140b, and to operably receive the second-station command request. The second secure micro-controller 133b is arranged to operably store the signature verification key of the secure command generating device 110. The second control circuit 135b is coupled with the second communication interface 131b and the second secure micro-controller 133b, and arranged to operably communicate with the second command transmitting device 120b or the second target device 140b through the second communication interface 131b. The second control circuit 135b is also arranged to operably cooperate with the second secure micro-controller 133b to authenticate the second-station command request using the signature verification key. The second storage circuit 137b is coupled with the second control circuit 135b, and arranged to operably store data required for the operation of the second control circuit 135b. The second control circuit 135b instructs the second target device 140b to execute a second target command corresponding to the second-station command request only if the second-station command request can pass the authentication processes conducted by the second secure micro-controller 133b and the second control circuit 135b.

The third command authentication circuit 130c comprises a third communication interface 131c, a third secure micro-controller 133c, a third control circuit 135c, and a third storage circuit 137c. The third communication interface 131c is arranged to operably communicate with the third command transmitting device 120c or the third target device 140c, and to operably receive the third-station command request. The third secure micro-controller 133c is arranged to operably store the signature verification key of the secure command generating device 110. The third control circuit 135c is coupled with the third communication interface 131c and the third secure micro-controller 133c, and arranged to operably communicate with the third command transmitting device 120c or the third target device 140c through the third communication interface 131c. The third control circuit 135c is also arranged to operably cooperate with the third secure micro-controller 133c to authenticate the third-station command request using the signature verification key. The third storage circuit 137c is coupled with the third control circuit 135c, and arranged to operably store data required for the operation of the third control circuit 135c. The third control circuit 135c instructs the third target device 140c to execute a third target command corresponding to the third-station command request only if the third-station command request can pass the authentication processes conducted by the third secure micro-controller 133c and the third control circuit 135c.

Figure 8:
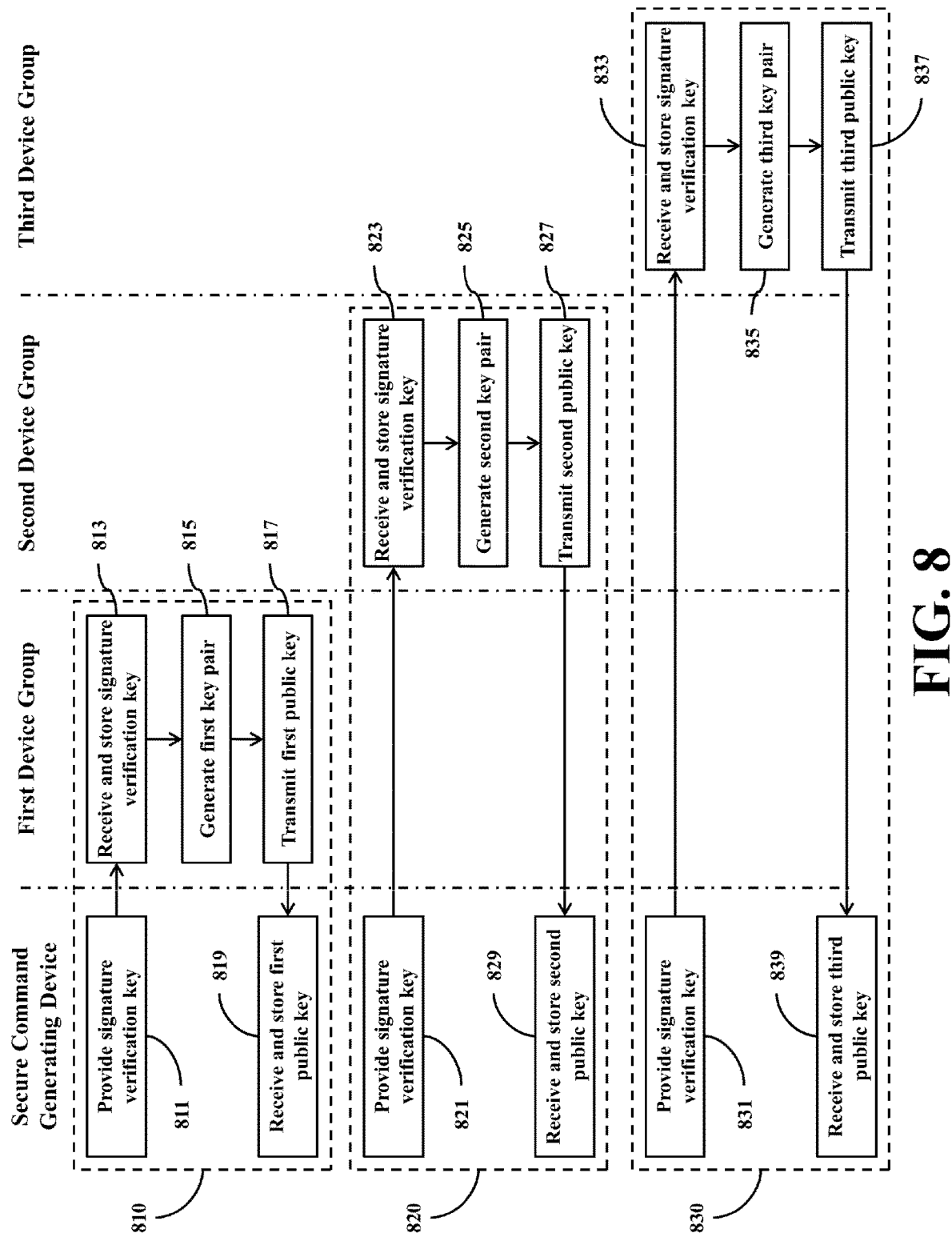
FIGS. 8~10 collectively show a simplified flowchart illustrating a collaborative operating method according to one embodiment of the present disclosure.
Figure 9:
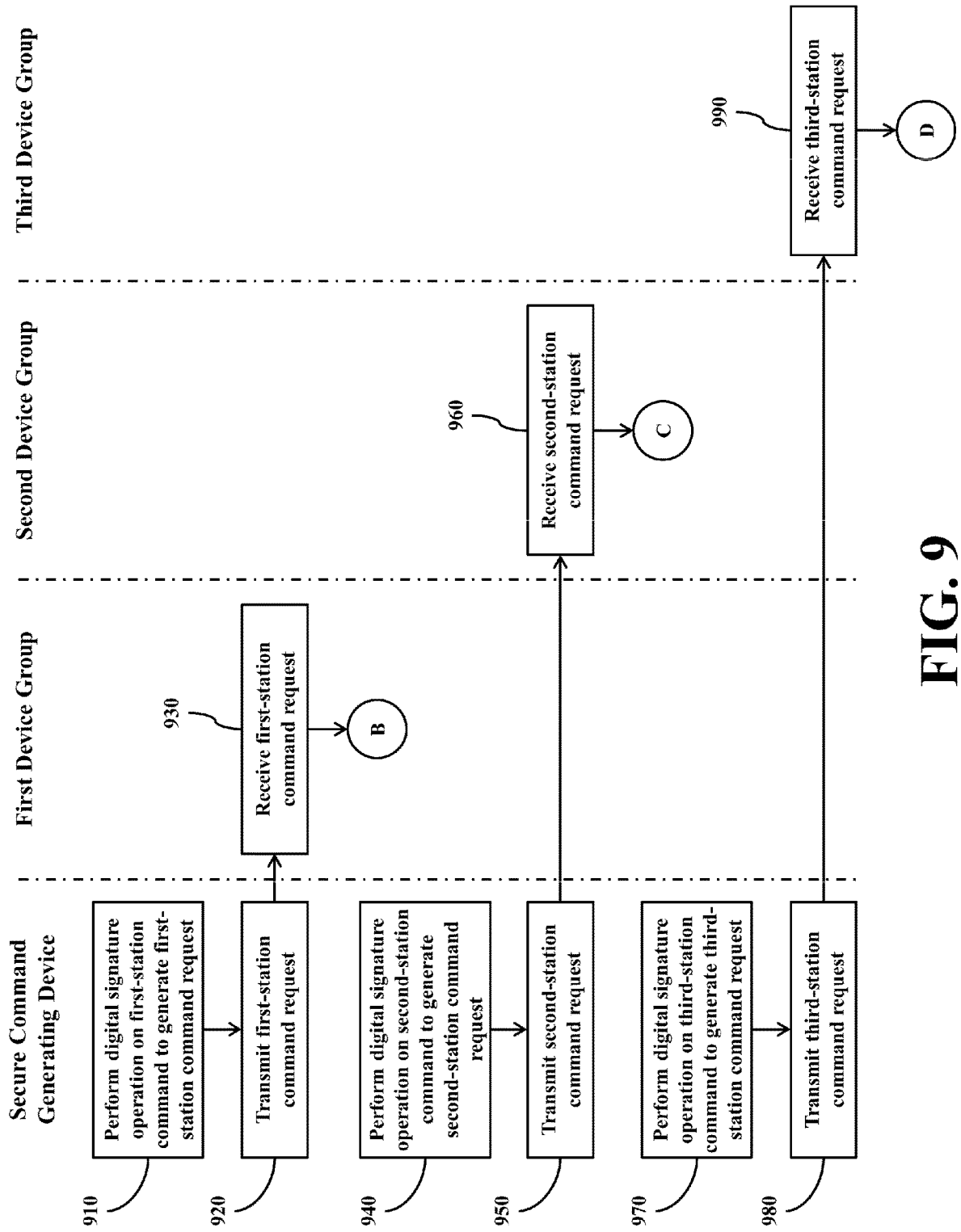
Figure 10:
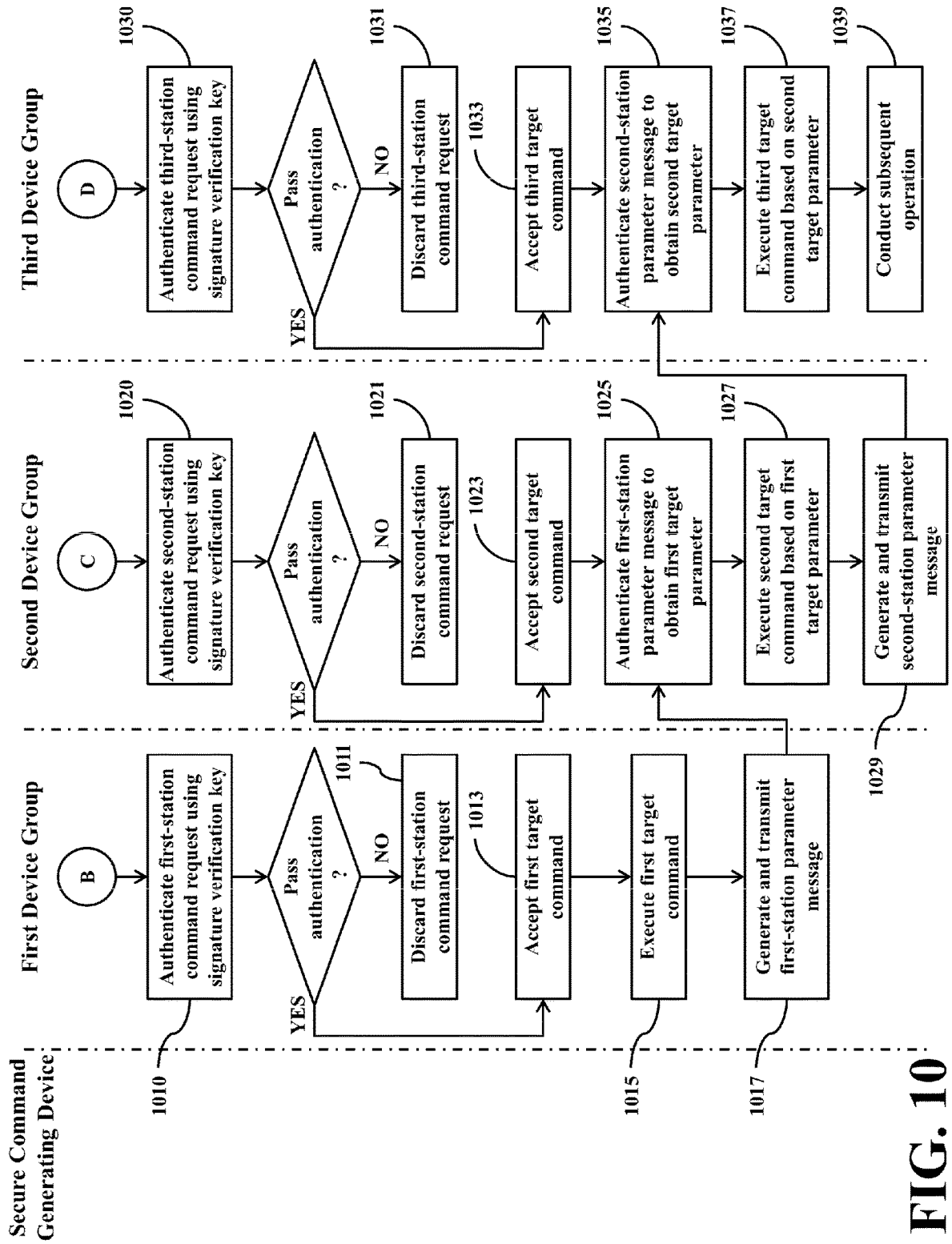

Please refer to FIGS. 8~10, which collectively show a simplified flowchart illustrating a collaborative operating method according to one embodiment of the present disclosure. The operations of the collaborative operating system 700 will be further described in the following by reference to FIGS. 8~10.

In the collaborative operating system 700, the secure command generating device 110 would establish the aforementioned hardware pairing relationship with the first command authentication circuit 130a, the second command authentication circuit 130b, and the third command authentication circuit 130c, respectively.

As shown in FIG. 8, the secure command generating device 110 and the first device group 710 may perform the operation 810, so that the first command authentication circuit 130a can obtain the signature verification key of the secure command generating device 110 to establish a hardware pairing relationship between the secure command generating device 110 and the first command authentication circuit 130a.

For example, the secure command generating device 110 and the first device group 710 may perform the operations 811 through 819 to realize the operation 810. Similar with the embodiment of FIG. 2, the first secure micro-controller 133a of the first command authentication circuit 130a may generate a key pair (hereinafter, referred to as a first key pair). The first secure micro-controller 133a may store the private key of the first key pair in its internal secret/sensitive data storage space, and transmit the public key of the first key pair to the secure command generating device 110 through the first control circuit 135a.

The secure command generating device 110 and the second device group 720 may perform the operation 820, so that the second command authentication circuit 130b can obtain the signature verification key of the secure command generating device 110 to establish a hardware pairing relationship between the secure command generating device 110 and the second command authentication circuit 130b.

For example, the secure command generating device 110 and the second device group 720 may perform the operations 821 through 829 to realize the operation 820. Similar with the embodiment of FIG. 2, the second secure micro-controller 133b of the second command authentication circuit 130b may generate a key pair (hereinafter, referred to as a second key pair). The second secure micro-controller 133b may store the private key of the second key pair in its internal secret/sensitive data storage space, and transmit the public key of the second key pair to the secure command generating device 110 through the second control circuit 135b.

The secure command generating device 110 and the third device group 730 may perform the operation 830, so that the third command authentication circuit 130c can obtain the signature verification key of the secure command generating device 110 to establish a hardware pairing relationship between the secure command generating device 110 and the third command authentication circuit 130c.

For example, the secure command generating device 110 and the third device group 730 may perform the operations 831 through 839 to realize the operation 830. Similar with the embodiment of FIG. 2, the third secure micro-controller 133c of the third command authentication circuit 130c may generate a key pair (hereinafter, referred to as a third key pair). The third secure micro-controller 133c may store the private key of the third key pair in its internal secret/sensitive data storage space, and transmit the public key of the third key pair to the secure command generating device 110 through the third control circuit 135c.

The operation concept of the operations 811 through 819 is the same as the operations 201 through 209 in FIG. 2. The operation concept of the operations 821 through 829 is the same as the operations 201 through 209 in FIG. 2. The operation concept of the operations 831 through 839 is the same as the operations 201 through 209 in FIG. 2. For the sake of brevity, those descriptions will not be repeated here.

As shown in FIG. 9, the secure command generating device 110 may perform the operation 910 to conduct a digital signature operation on the first-station command using the signature key of the secure command generating device 110 to generate the first-station command request.

Then, the secure command generating device 110 may perform the operation 920 to transmit the first-station command request to the first device group 710.

In the operation 930, the first command transmitting device 120a in the first device group 710 receives the first-station command request transmitted from the secure command generating device 110, and directly or indirectly transmits the first-station command request to the first command authentication circuit 130a.

The secure command generating device 110 may perform the operation 940 to conduct a digital signature operation on the second-station command using the signature key of the secure command generating device 110 to generate the second-station command request.

Then, the secure command generating device 110 may perform the operation 950 to transmit the second-station command request to the second device group 720.

In the operation 960, the second command transmitting device 120b in the second device group 720 receives the second-station command request transmitted from the secure command generating device 110, and directly or indirectly transmits the second-station command request to the second command authentication circuit 130b.

The secure command generating device 110 may perform the operation 970 to conduct a digital signature operation on the third-station command using the signature key of the secure command generating device 110 to generate the third-station command request.

Then, the secure command generating device 110 may perform the operation 980 to transmit the third-station command request to the third device group 730.

In the operation 990, the third command transmitting device 120c in the third device group 730 receives the third-station command request transmitted from the secure command generating device 110, and directly or indirectly transmits the third-station command request to the third command authentication circuit 130c.

The concept of the operations 910 through 930 is the same as the aforementioned operations 290 through 330 or the aforementioned operations 290 through 630. In addition, the concept of the operations 940 through 960 is the same as the aforementioned operations 290 through 330 or the aforementioned operations 290 through 630. Similarly, the concept of the operations 970 through 990 is the same as the aforementioned operations 290 through 330 or the aforementioned operations 290 through 630. In other words, the secure command generating device 110 may adopt the method of FIG. 4 to generate related command requests in the operations 910, 940, and 970. For the sake of brevity, details of those operations will not be repeated here.

As shown in FIG. 10, after receiving the first-station command request, the first command authentication circuit 130a performs the operation 1010.

In the operation 1010, the first control circuit 135a may cooperate with the first secure micro-controller 133a to authenticate the reality and correctness of the received first-station command request using the aforementioned signature verification key. The first control circuit 135a and the first secure micro-controller 133a may adopt the method of FIG. 5 or related variety in the operation 1010 to authenticate the reality and correctness of the first-station command request. For the sake of brevity, details of those operations will not be repeated here.

If the first-station command request fails to pass the authentication process conducted by the first secure micro-controller 133a or the first control circuit 135a, the first control circuit 135a would determine that the first-station command request is a forged command request. In this situation, the first control circuit 135a would perform the operation 1011 to discard the first-station command request.

On the contrary, if the first-station command request passed the authentication process conducted by the first secure micro-controller 133a and the first control circuit 135a, the first control circuit 135a would perform the operation 1013 to accept a first target command corresponding to the first-station command request as an authenticated command.

In the operation 1015, the first control circuit 135a transmits the first target command to the first target device 140a to instruct the first target device 140a to execute the first target command. The operating result (e.g., related operation value, parameter, data, indication message, etc.) obtained by the first target device 140a by executing the first target command is referred to as a first-station parameter hereinafter. The operating concept of the operation 1015 is the same as the operations 370 through 390 in the embodiment of FIG. 3. For the sake of brevity, details of those operations will not be repeated here.

In the operation 1017, the first control circuit 135a may cooperate with the first secure micro-controller 133a to conduct a digital signature operation on the first-station parameter using the private key of the first key pair to generate a corresponding first-station parameter message, and transmit the first-station parameter message to the second device group 720 through the first command transmitting device 120a.

Figure 11:
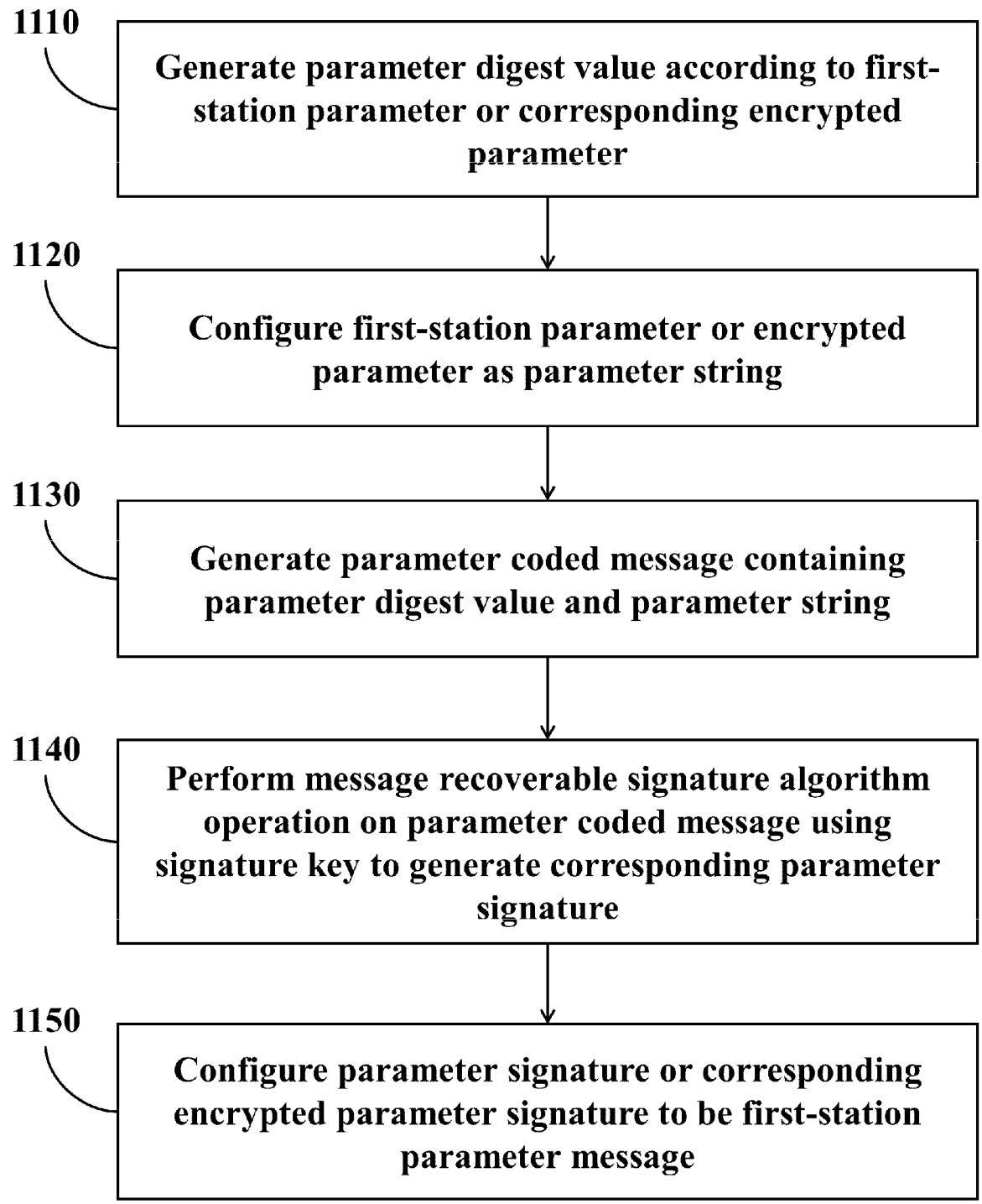
FIG. 11 shows a simplified flowchart illustrating a method for generating a parameter message according to one embodiment of the present disclosure.

Please refer to FIG. 11, which shows a simplified flowchart illustrating a method for generating a parameter message according to one embodiment of the present disclosure. The first control circuit 135a and the first secure micro-controller 133a may adopt the method of FIG. 11 in the operation 1017 to generate the first-station parameter message.

In the operation 1110, the first control circuit 135a may generate a corresponding digest value (hereinafter, referred to as a parameter digest value) based on the first-station parameter. For example, the first control circuit 135a may directly perform a Hash algorithm operation on the first-station parameter to generate the parameter digest value. Alternatively, the first control circuit 135a may first instruct the first secure micro-controller 133a to encrypt the first-station parameter using other encryption key or the public key of the second command authentication circuit 130b (i.e., the public key of the second key pair) to generate a corresponding encrypted parameter, and then the first control circuit 135a may perform the Hash algorithm operation on the encrypted parameter to generate the parameter digest value. In other words, the parameter digest value may be generated based on the plaintext of the first-station parameter, or may be generated based on the ciphertext of the first-station parameter.

In the operation 1120, the first control circuit 135a may configure the first-station parameter or the encrypted parameter to be a parameter string.

Then, the first control circuit 135a may perform the operation 1130 to generate a coded message (hereinafter, referred to as a parameter coded message) containing the parameter digest value and the parameter string, while configure the parameter string to be a padding string in the parameter coded message. Accordingly, the padding string of the parameter coded message is recorded with the plaintext or ciphertext of the first-station parameter. In practice, the first control circuit 135a may also record the object identification code and/or other related data of the Hash algorithm in the parameter coded message.

In the operation 1140, the first secure micro-controller 133a may perform a message recoverable signature algorithm operation on the parameter coded message using the private key of the first secure micro-controller 133a (i.e., the private key of the first key pair) to generate a corresponding signature (hereinafter, referred to as a parameter signature).

Then, the first control circuit 135a may perform the operation 1150 to generate the first-station parameter message based on the parameter signature. For example, the first control circuit 135a may simply configure the parameter signature to be the first-station parameter message. Alternatively, the first control circuit 135a may first instruct the first secure micro-controller 133a to encrypt the parameter signature using other encryption key or the public key of the second command authentication circuit 130b (i.e., the public key of the second key pair) to generate a corresponding encrypted version (hereinafter, referred to as an encrypted parameter signature). The first control circuit 135a then configures the encrypted parameter signature to be the aforementioned first-station parameter message. In other words, the first-station parameter message may be generated based on the plaintext of the parameter signature, or may be generated based on the ciphertext of the parameter signature.

If the data length of the parameter string exceeds the padding string length of a single parameter coded message, the first control circuit 135a may segment the content of the parameter string into multiple parameter coded messages and generate multiple corresponding first-station parameter messages.

It can be appreciated from the foregoing descriptions that the first-station parameter message generated by the cooperation of the first control circuit 135a and the first secure micro-controller 133a has been recorded with the content of the first-station parameter or its encrypted version. Accordingly, when the first-station parameter message is received by the second command authentication circuit 130b, the second command authentication circuit 130b is enabled to restore the first-station parameter from the first-station parameter message by performing a corresponding message recoverable signature algorithm operation on the first-station parameter message. As a result, the first control circuit 135a only needs to transmit the first-station parameter message to the second device group 720, and does not need to additionally transmit the first-station parameter or its encrypted version to the second device group 720.

As shown in FIG. 10, after receiving the second-station command request, the second command authentication circuit 130b performs the operation 1020.

In the operation 1020, the second control circuit 135b may cooperate with the second secure micro-controller 133b to authenticate the reality and correctness of the received second-station command request using the aforementioned signature verification key. The second control circuit 135b and the second secure micro-controller 133b may adopt the method of FIG. 5 or related variety in the operation 1020 to authenticate the reality and correctness of the second-station command request. For the sake of brevity, details of those operations will not be repeated here.

If the second-station command request fails to pass the authentication process conducted by the second secure micro-controller 133b or the second control circuit 135b, the second control circuit 135b would determine that the second-station command request is a forged command request. In this situation, the second control circuit 135b would perform the operation 1021 to discard the second-station command request.

On the contrary, if the second-station command request passed the authentication process conducted by the second secure micro-controller 133b and the second control circuit 135b, the second control circuit 135b may perform the operation 1023 to accept a second target command corresponding to the second-station command request as an authenticated command.

When the first-station parameter message transmitted from the first device group 710 is received by the second device group 720, the second command authentication circuit 130b performs the operation 1025.

In the operation 1025, the second control circuit 135b cooperates with the second secure micro-controller 133b to authenticate the reality and correctness of the first-station parameter message transmitted from the first device group 710 using the public key of the first command authentication circuit 130a (i.e., the public key of the first key pair) to obtain a corresponding first target parameter.

If the first-station parameter message fails to pass (i.e., does not pass) the authentication processes conducted by the second control circuit 135b or the second secure micro-controller 133b, the second control circuit 135b would determine that the first-station parameter message is a forged parameter message, and thus discard the first-station parameter message.

On the contrary, if the first-station parameter message passed the authentication processes conducted by the second control circuit 135b and the second secure micro-controller 133b, the second control circuit 135b would accept the first target parameter as an authenticated parameter.

In the operation 1027, the second control circuit 135b transmits the second target command and the first target parameter to the second target device 140b to instruct the second target device 140b to execute the second target command based on the first target parameter. The operating result (e.g., related operation value, parameter, data, indication message, etc.) obtained by the second target device 140b by executing the second target command is referred to as a second-station parameter hereinafter. The operating concept of the operation 1027 is the same as the operations 370 through 390 in the embodiment of FIG. 3. For the sake of brevity, details of those operations will not be repeated here.

In the operation 1029, the second control circuit 135b may cooperate with the second secure micro-controller 133b to conduct a digital signature operation on the second-station parameter using the private key of the second key pair to generate a corresponding second-station parameter message, and transmit the second-station parameter message to the third device group 730 through the second command transmitting device 120b. The operating concept of the operation 1029 is the same as the aforementioned operation 1017. For the sake of brevity, details of the operation will not be repeated here.

Figure 12:
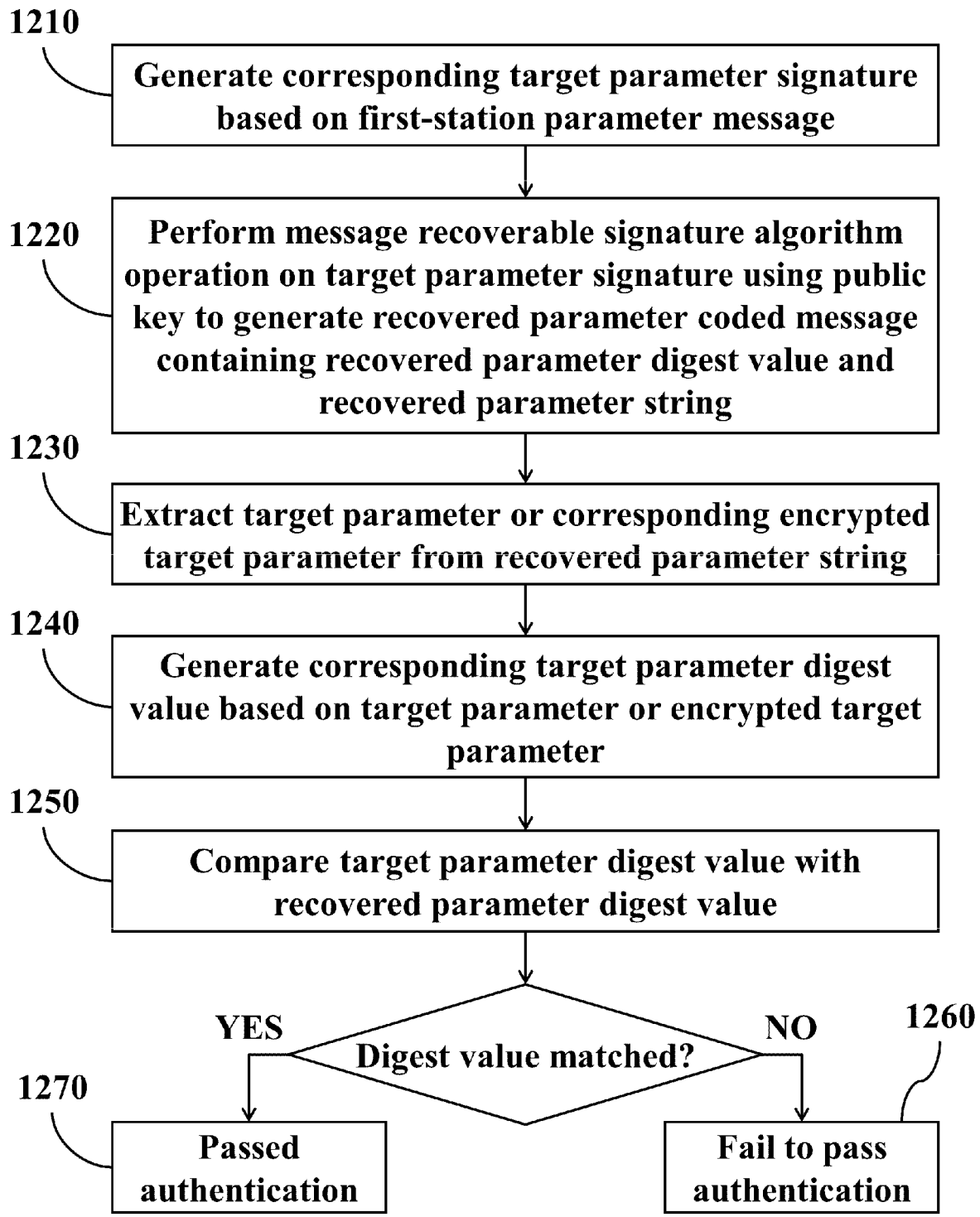
FIG. 12 shows a simplified flowchart illustrating a method for authenticating a parameter message according to one embodiment of the present disclosure.

Please refer to FIG. 12, which shows a simplified flowchart illustrating a method for authenticating a parameter message according to one embodiment of the present disclosure. The second control circuit 135b and the second secure micro-controller 133b may adopt the method of FIG. 12 in the operation 1025 to authenticate the reality and correctness of the first-station parameter message.

In the operation 1210, the second control circuit 135b and/or the second secure micro-controller 133b may generate a corresponding signature (hereinafter, referred to as a target parameter signature) based on the received first-station parameter message.

For example, in the embodiments where the first control circuit 135a configures the parameter signature to be the first-station parameter message, the second control circuit 135b may directly obtain the target parameter signature from the received first-station parameter message.

For another example, in the embodiments where the first control circuit 135a configures the encrypted parameter signature to be the first-station parameter message, the second control circuit 135b may transmit the received first-station parameter message to the second secure micro-controller 133b through the secured data channel, and instruct the second secure micro-controller 133b to decrypt the first-station parameter message. The second secure micro-controller 133b decrypts the first-station parameter message according to the instruction of the second control circuit 135b by using a corresponding decryption key or the private key of the second command authentication circuit 130b (i.e., the private key of the second key pair).

If the second secure micro-controller 133b fails to successfully decrypt (i.e., unable to decrypt) the first-station parameter message, it means failure of the authentication process of the first-station parameter message, and also means that the first-station parameter message fails to pass (i.e., does not pass) the authentication processes conducted by the second secure micro-controller 133b. In this situation, the second secure micro-controller 133b may actively inform the second control circuit 135b of that the first-station parameter message fails to pass the authentication processes. Alternatively, the second control circuit 135b may independently determine that the first-station parameter message fails to pass the authentication processes conducted by the second secure micro-controller 133b if the second secure micro-controller 133b cannot send a notice to the second control circuit 135b within a predetermined length of time period, and thus the second secure micro-controller 133b may not need to actively inform the second control circuit 135b of the failure of the authentication process of the first-station parameter message.

On the contrary, if the second secure micro-controller 133b can successfully decrypt the first-station parameter message, the second secure micro-controller 133b generates the aforementioned target parameter signature, and transmits the target parameter signature to the second control circuit 135b through the secured data channel. In other words, the target parameter signature may be independently generated by the second control circuit 135b, or may be generated by the cooperation of the second control circuit 135b and the second secure micro-controller 133b.

After obtaining the target parameter signature, the second control circuit 135b may instruct the second secure micro-controller 133b to conduct a digital signature algorithm operation on the target parameter signature. In this situation, the second secure micro-controller 133b performs the operation 1220.

In the operation 1220, the second secure micro-controller 133b may perform a message recoverable signature algorithm operation on the target parameter signature according to the instruction of the second control circuit 135b by using the public key of the first secure micro-controller 133a (i.e., the public key of the first key pair). The message recoverable signature algorithm employed by the second secure micro-controller 133b in the operation 1220 corresponds to the message recoverable signature algorithm employed by the first secure micro-controller 133a in the aforementioned operation 1140.

If the second secure micro-controller 133b cannot successfully obtain the computing result of the message recoverable signature algorithm, it means failure of the authentication process of the first-station parameter message, and also means that the first-station parameter message fails to pass (i.e., does not pass) the authentication processes conducted by the second secure micro-controller 133b. In this situation, the second secure micro-controller 133b may actively inform the second control circuit 135b of that the first-station parameter message fails to pass the authentication processes. Alternatively, the second control circuit 135b may independently determine that the first-station parameter message fails to pass the authentication processes conducted by the second secure micro-controller 133b if the second secure micro-controller 133b cannot send a notice to the second control circuit 135b within a predetermined length of time period, and thus the second secure micro-controller 133b may not need to actively inform the second control circuit 135b of the failure of the authentication process of the first-station parameter message.

On the contrary, if the second secure micro-controller 133b can successfully obtain the computing result of the message recoverable signature algorithm, the second secure micro-controller 133b generates a coded message (hereinafter, referred to as a recovered parameter coded message) corresponding to the target parameter signature, wherein the recovered parameter coded message contains a digest value (hereinafter, referred to as a recovered parameter digest value) and a padding string (hereinafter, referred to as a recovered parameter string).

In theory, if the target parameter signature is a real and correct signature rather than a forged signature, then the recovered parameter coded message generated by the second secure micro-controller 133b in the operation 1220 should be identical to the parameter coded message generated by the first control circuit 135a in the aforementioned operation 1130, and the recovered parameter digest value and the recovered parameter string contained in the recovered parameter coded message should be respectively identical to the parameter digest value and the parameter string contained in the aforementioned parameter coded message.

The second secure micro-controller 133b may transmit the recovered parameter coded message to the second control circuit 135b through the secured data channel.

In the operation 1230, the second control circuit 135b may extract the aforementioned first target parameter or an encrypted version of the first target parameter (hereinafter, referred to as an encrypted target parameter) from the recovered parameter string.

If the data extracted from the recovered parameter string by the second control circuit 135b is the encrypted target parameter, the second control circuit 135b may transmit the encrypted target parameter to the second secure micro-controller 133b through the secured data channel, and instruct the second secure micro-controller 133b to decrypt the encrypted target parameter. The second secure micro-controller 133b may decrypt the encrypted target parameter according to the instruction of the second control circuit 135b by using a corresponding decryption key of the private key of the second command authentication circuit 130b (i.e., the private key of the second key pair).

If the second secure micro-controller 133b fails to successfully decrypt (i.e., unable to decrypt) the encrypted target parameter, it means failure of the authentication process of the first-station parameter message, and also means that the first-station parameter message fails to pass (i.e., does not pass) the authentication processes conducted by the second secure micro-controller 133b. In this situation, the second secure micro-controller 133b may actively inform the second control circuit 135b of that the first-station parameter message fails to pass the authentication processes. Alternatively, the second control circuit 135b may independently determine that the first-station parameter message fails to pass the authentication processes conducted by the second secure micro-controller 133b if the second secure micro-controller 133b cannot send a notice to the second control circuit 135b within a predetermined length of time period, and thus the second secure micro-controller 133b may not need to actively inform the second control circuit 135b of the failure of the authentication process of the first-station parameter message.

On the contrary, if the second secure micro-controller 133b an successfully decrypt the encrypted target parameter, the second secure micro-controller 133b generates the first target parameter, and transmits the first target parameter to the second control circuit 135b through the secured data channel.

In other words, the first target parameter may be independently obtained from the recovered parameter string by the second control circuit 135b, or may be generated by the cooperation of the second control circuit 135b and the second secure micro-controller 133b.

In the operation 1240, the second control circuit 135b may generate a corresponding digest value (hereinafter, referred to as a target parameter digest value) based on the first target parameter or the encrypted target parameter.

For example, in the embodiments where the first control circuit 135a generates the aforementioned parameter digest value by performing the Hash algorithm operation on the encrypted parameter, the second control circuit 135b may perform a corresponding Hash algorithm operation on the encrypted target parameter to generate the target parameter digest value.

For another example, in the embodiments where the first control circuit 135a generates the aforementioned parameter digest value by performing the Hash algorithm operation on the first-station parameter, the second control circuit 135b may perform a corresponding Hash algorithm operation on the first target parameter to generate the target parameter digest value.

In other words, the target parameter digest value may be generated based on the plaintext of the first target parameter, or may be generated based on the ciphertext of the first target parameter.

Then, the second control circuit 135b may perform the operation 1250 to compare the target parameter digest value with the recovered parameter digest value. In theory, if the first target parameter or the encrypted target parameter is real data rather than forged data, then the target parameter digest value generated by the second control circuit 135b should be identical to the recovered parameter digest value contained in the recovered parameter coded message generated by the second secure micro-controller 133b.

If the target parameter digest value does not identical to the recovered parameter digest value, it means failure of the authentication process of the first-station parameter message, and also means that the first-station parameter message fails to pass (i.e., does not pass) the authentication processes conducted by the second control circuit 135b.

On the contrary, if the target parameter digest value is identical to the recovered parameter digest value, it means that the first-station parameter message passed the authentication process conducted by the second secure micro-controller 133b and the second control circuit 135b. In this situation, the second control circuit 135b would accept the first target parameter as an authenticated parameter.

In the aforementioned operation 1140, the signature algorithm employed by the first command authentication circuit 130a in generating the parameter signature is a message recoverable signature algorithm. But this is merely an exemplary embodiment, rather than a restriction to the practical implementations.

In practice, the signature algorithm employed by the first command authentication circuit 130a in generating the parameter signature may be other signature algorithm than the message recoverable signature algorithm. In this situation, the first-station parameter or the corresponding encrypted parameter would not be recorded in the padding string of the parameter coded message. Therefore, the first command authentication circuit 130a has to additionally transmit the first-station parameter or the encrypted parameter to the second device group 720 through the first command transmitting device 120a.

When authenticating the first-station parameter message, the second control circuit 135b and/or the second secure micro-controller 133b may perform the aforementioned operation 1210 to generate a corresponding signature (also referred to as a target parameter signature) corresponding to the received first-station parameter message.

As described previously, in the embodiments where the first command authentication circuit 130a configures the encrypted parameter signature to be the first-station parameter message, the second control circuit 135b may transmit the received first-station parameter message to the second secure micro-controller 133b through the secured data channel, and instruct the second secure micro-controller 133b to decrypt the first-station parameter message. The second secure micro-controller 133b may decrypt the first-station parameter message according to the instruction of the second control circuit 135b by using a corresponding decryption key of the private key of the second command authentication circuit 130b (i.e., the private key of the second key pair).

If the second secure micro-controller 133b fails to successfully decrypt (i.e., unable to decrypt) the first-station parameter message, it means failure of the authentication process of the first-station parameter message, and also means that the first-station parameter message fails to pass (i.e., does not pass) the authentication processes conducted by.

On the contrary, if the second secure micro-controller 133b can successfully decrypt the first-station parameter message, the second secure micro-controller 133b generates the aforementioned target parameter signature, and transmits the target parameter signature to the second control circuit 135b through the secured data channel. In other words, the target parameter signature may be independently generated by the second control circuit 135b, or may be generated by the cooperation of the second control circuit 135b and the second secure micro-controller 133b.

After obtaining the target parameter signature, the second control circuit 135b may instruct the second secure micro-controller 133b to conduct a digital signature algorithm operation on the target parameter signature.

In this embodiment, the second secure micro-controller 133b may perform a message recoverable signature algorithm operation on the target parameter signature according to the instruction of the second control circuit 135b by using the public key of the first secure micro-controller 133a (i.e., the public key of the first key pair) to generate a digest (also referred to as a recovered parameter digest value). The message recoverable signature algorithm employed by the second secure micro-controller 133b in this operation corresponds to the message recoverable signature algorithm employed by the first command authentication circuit 130a in generating the parameter signature.

If the second secure micro-controller 133b fails to successfully generate (i.e., unable to generate) the recovered parameter digest value, it means failure of the authentication process of the first-station parameter message, and also means that the first-station parameter message fails to pass (i.e., does not pass) the authentication processes conducted by the second secure micro-controller 133b.

If the data received by the communication interface 131 is the encrypted target parameter, the second control circuit 135b may transmit the encrypted target parameter to the second secure micro-controller 133b through the secured data channel, and instruct the second secure micro-controller 133b to decrypt the encrypted target parameter. The second secure micro-controller 133b may decrypt the encrypted target parameter according to the instruction of the second control circuit 135b by using a corresponding decryption key or the private key of the second command authentication circuit 130b (i.e., the private key of the second key pair). If the second secure micro-controller 133b fails to successfully decrypt (i.e., unable to decrypt) the encrypted target parameter, it means failure of the authentication process of the first-station parameter message, and also means that the first-station parameter message fails to pass (i.e., does not pass) the authentication processes conducted by the second secure micro-controller 133b.

Similar with the aforementioned operations 1240 and 1250, the second control circuit 135b may generate the corresponding target parameter digest value based on the target parameter or the encrypted target parameter, and compare the recovered parameter digest value generated by the second secure micro-controller 133b with the target parameter digest value. If the target parameter digest value does not identical to the recovered parameter digest value, it means failure of the authentication process of the first-station parameter message, and also means that the first-station parameter message fails to pass (i.e., does not pass) the authentication processes conducted by the second control circuit 135b.

As shown in FIG. 10, after receiving the third-station command request, the third command authentication circuit 130c performs the operation 1030.

In the operation 1030, the third control circuit 135c may cooperate with the third secure micro-controller 133c to authenticate the reality and correctness of the received third-station command request using the aforementioned signature verification key. The third control circuit 135c and the third secure micro-controller 133c may adopt the method of FIG. 5 or related variety in the operation 1030 to authenticate the reality and correctness of the third-station command request. For the sake of brevity, details of those operations will not be repeated here.

If the third-station command request fails to pass the authentication process conducted by the third secure micro-controller 133c or the third control circuit 135c, the third control circuit 135c would determine that the third-station command request is a forged command request. In this situation, the third control circuit 135c may perform the operation 1031 to discard the third-station command request.

On the contrary, if the third-station command request passed the authentication process conducted by the third secure micro-controller 133c and the third control circuit 135c, the third control circuit 135c may perform the operation 1033 to accept a third target command corresponding to the third-station command request as an authenticated command.

When the second-station parameter message transmitted from the second device group 720 is received by the third device group 730, the third command authentication circuit 130c performs the operation 1035.

In the operation 1035, the third control circuit 135c cooperates with the third secure micro-controller 133c to authenticate the reality and correctness of the second-station parameter message transmitted from the second device group 720 using the public key of the second command authentication circuit 130b (i.e., the public key of the second key pair) to obtain a corresponding second target parameter. The operating concept of the operation 1035 is the same as the aforementioned operation 1025. For the sake of brevity, details of the operations will not be repeated here.

If the second-station parameter message fails to pass the authentication process conducted by the third control circuit 135c or the third secure micro-controller 133c, the third control circuit 135c would determine that the second-station parameter message is a forged parameter message, and discard the second-station parameter message.

On the contrary, if the second-station parameter message passed the authentication processes conducted by the third control circuit 135c and the third secure micro-controller 133c, the third control circuit 135c would accept the second target parameter as an authenticated parameter.

In the operation 1037, the third control circuit 135c transmits the third target command and the second target parameter to the third target device 140c to instruct the third target device 140c to execute the third target command based on the second target parameter. The operating concept of the operation 1037 is the same as the operations 370 through 390 in the embodiment of FIG. 3. For the sake of brevity, details of those operations will not be repeated here.

After the third target command is executed by the third target device 140c, the third control circuit 135c may perform the operation 1039 to control the third device group 730 to conduct subsequent operations. For example, the third control circuit 135c may transmit the operating result (e.g., related operation value, parameter, data, indication message, etc.) obtained by the third target device 140c by executing the third target command to the secure command generating device 110 or a next device group through the third command transmitting device 120c.

It can be appreciated from the foregoing descriptions that, in the collaborative operating system 700, a device group in a later stage would conduct operations based on the operating result of another device group in a prior stage to together accomplish a specific collaborative operation assigned or configured by the secure command generating device 110.

In the collaborative operating system 700, a target command corresponding to a specific command request received by any device group would be accepted as an authenticated command only if the specific command request can pass the authentication processes conducted by the command authentication circuit (e.g., the aforementioned command authentication circuit 130a, 130b, or 130c) of the device group. Those commands, which lack the signature of the secure command generating device 110 or are unable to be successfully decrypted by the secure micro-controller of the command authentication circuit, would be filtered out by the command authentication circuit, so as to prevent those commands from being executed by the target device (e.g., the aforementioned target device 140a, 140b, or 140c).

Accordingly, even malicious program codes or intruders can hack into the communication process between the command transmitting device and the command authentication circuit, the forged commands generated by the malicious program codes or intruders would be effectively filtered out by the command authentication circuit and will not be executed by the target device in the device group for the reason that these forged commands are not generated by using the signature of the secure command generating device 110.

In addition, a target parameter corresponding to a specific parameter message received by any device group would be accepted as an authenticated parameter (i.e., would be determined as an secure parameter) only if the specific parameter message can pass the authentication processes conducted by the command authentication circuit (e.g., the aforementioned command authentication circuit 130a, 130b, or 130c) of the device group. Those parameters, which lack the signature of the command authentication circuit in the prior stage or are unable to be successfully decrypted by the secure micro-controller of the command authentication circuit, would be filtered out by the command authentication circuit in the later stage, so as to prevent those parameters from being utilized as basis or reference for the operation of the target device (e.g., the aforementioned target device 140a, 140b, or 140c) in the later stage.

Accordingly, even malicious program codes or intruders can hack into the communication process between different device groups, the forged parameter messages generated by the malicious program codes or intruders would be effectively filtered out by the command authentication circuit in the later stage and will not be adopted by the target device in the later stage for the reason that these forged parameter messages are not generated by using the signature of the secure micro-controller in the prior stage.

Moreover, the command authentication circuit (e.g., the aforementioned command authentication circuit 130a, 130b, or 130c) in each of the aforementioned device groups automatically conducts the operations of authenticating command requests and parameter messages without user intervention. Therefore, the collaborative operating system 700 has merits of great operating convenience and application flexibility, and capable of ensuring the reality and correctness of the commands and related operating parameters in various IoT systems or Industry 4.0 smart manufacturing systems.

Please note that the executing order of the operations in FIG. 8 through FIG. 10 described previously is merely an exemplary embodiment, rather than a restriction to practical implementations. For example, the executing order of the operations 810, 820, and 830 in FIG. 8 can be modified as needed. The executing order of the operations 910-930, 940-960, and 970-990 in FIG. 9 can be modified as needed. Similarly, the executing order of the operations 1010, 1020, 1030 and some subsequent operations in FIG. 10 can be modified as needed.

In addition, the quantity of the device groups in the collaborative operating system 700 may be increased or decreased depending on requirement of the practical application.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A collaborative operating system, comprising:
a secure command generating device, arranged to perform a digital signature operation on a first-station command to generate a first-station command request, to perform a digital signature operation on a second-station command to generate a second-station command request, and to perform a digital signature operation on a third-station command to generate a third-station command request;
a first device group;
a second device group; and
a third device group;
wherein the first device group comprises:
a first command transmitting device, arranged to receive and transmit the first-station command request;
a first command authentication circuit comprising:
a first communication interface, arranged to receive the first-station command request;
a first secure micro-controller, arranged to store a signature verification key of the secure command generating device;
a first control circuit, coupled with the first communication interface and the first secure micro-controller, arranged cooperate with the first secure micro-controller to authenticate the first-station command request using the signature verification key; and
a first storage circuit, coupled with the first control circuit, and arranged to store data required for operations of the first control circuit; and
a first target device, arranged to communicate with first control circuit;
wherein the first control circuit is further arranged to instructs the first target device to execute a first target command corresponding to the first-station command request only when the first-station command request passed authentication processes conducted by the first secure micro-controller and the first control circuit;
wherein the second device group comprises:
a second command transmitting device, arranged to receive and transmit the second-station command request;
a second command authentication circuit comprising:
a second communication interface, arranged to receive the second-station command request;
a second secure micro-controller, arranged to store the signature verification key of the secure command generating device;
a second control circuit, coupled with the second communication interface and the second secure micro-controller, arranged to cooperate with the second secure micro-controller to authenticate the second-station command request using the signature verification key; and
a second storage circuit, coupled with the second control circuit, and arranged to store data required for operations of the second control circuit; and
a second target device, arranged to communicate with second control circuit
wherein the second control circuit is further arranged to instructs the second target device to execute a second target command corresponding to the second-station command request only when the second-station command request passed authentication processes conducted by the second secure micro-controller and the second control circuit;
wherein the third device group comprises:
a third command transmitting device, arranged to receive and transmit the third-station command request;
a third command authentication circuit comprising:
a third communication interface, arranged to receive the third-station command request;
a third secure micro-controller, arranged to store the signature verification key of the secure command generating device;
a third control circuit, coupled with the third communication interface and the third secure micro-controller, arranged to cooperate with the third secure micro-controller to authenticate the third-station command request using the signature verification key; and
a third storage circuit, coupled with the third control circuit, and arranged to store data required for the operation of the third control circuit; and
a third target device, arranged to communicate with third control circuit wherein the third control circuit is further arranged to instructs the third target device to execute a third target command corresponding to the third-station command request only when the third-station command request passed authentication processes conducted by the third secure micro-controller and the third control circuit;
wherein the first control circuit is further arranged to cooperate with the first secure micro-controller to conduct operations to generate a corresponding first-station parameter message according to a first-station parameter generated by the first target device by executing the first target command;
the second control circuit is further arranged to cooperate with the second secure micro-controller to authenticate the first-station parameter message using a public key of the first command authentication circuit, and arranged to instruct the second target device to execute the second target command based on a first target parameter corresponding to the first-station parameter message only when the first-station parameter message passed the authentication processes conducted by the second control circuit and the second secure micro-controller; and
the secure command generating device is further arranged to generate multiple collaborative operation commands respectively corresponding to the first device group, the second device group, and the third device group, and to instruct a device group in a later stage to perform operation based on an operating result of another device group in a prior stage to together accomplish a collaborative operation.

2. The collaborative operating system of claim 1, wherein the first control circuit discards the first-station command request when the first-station command request fails to pass the authentication process conducted by the first secure micro-controller or the first control circuit.

3. The collaborative operating system of claim 1, wherein operations conducted by the secure command generating device to generate the first-station command request comprise:
generating a command digest value according to the first-station command or a corresponding encrypted command, wherein the encrypted command is generated by the secure command generating device by encrypting the first-station command;
configuring the first-station command or the encrypted command to be a command string;
generating a command coded message containing the command digest value and the command string, while configuring the command string to be a padding string in the command coded message;
performing a message recoverable signature algorithm operation on the command coded message using a signature key of the secure command generating device to generate a corresponding command signature; and
configuring the command signature or a corresponding encrypted command signature to be the first-station command request, wherein the encrypted command signature is generated by the secure command generating device by encrypting the command signature.

4. The collaborative operating system of claim 1, wherein the first secure micro-controller is further arranged to perform a message recoverable signature algorithm operation on a target command signature corresponding to the first-station command request using the signature verification key to generate a recovered command coded message containing a recovered command digest value and a recovered command string, and the first control circuit is further arranged to extract the first target command or a corresponding encrypted target command from the recovered command string, to generate a target command digest value according to the first target command or the encrypted target command, and to compare the target command digest value with the recovered command digest value;
wherein the first-station command request is allowed to pass the authentication processes conducted by the first secure micro-controller and the first control circuit only when the recovered command coded message is successfully generated by the first secure micro-controller while the target command digest value matches with the recovered command digest value.

5. The collaborative operating system of claim 4, wherein the first secure micro-controller is further arranged to decrypt the first-station command request to generate the target command signature;
wherein the first-station command request is not allowed to pass the authentication processes conducted by the first secure micro-controller when the first secure micro-controller fails to successfully decrypt the first-station command request.

6. The collaborative operating system of claim 4, wherein the first secure micro-controller is further arranged to decrypt the encrypted target command to generate the first target command;
wherein the first-station command request is not allowed to pass the authentication processes conducted by the first secure micro-controller when the first secure micro-controller fails to successfully decrypt the encrypted target command.

7. The collaborative operating system of claim 1, wherein operations of generating the first-station parameter message comprise:
the first control circuit generating a parameter digest value according to the first-station parameter or a corresponding encrypted parameter, wherein the encrypted parameter is generated by the first secure micro-controller by encrypting the first-station parameter;
the first control circuit configuring the first-station parameter or the encrypted parameter to be a parameter string;
the first control circuit generating a parameter coded message containing the parameter digest value and the parameter string, while configuring the parameter string to be a padding string in the parameter coded message;
the first secure micro-controller performing a message recoverable signature algorithm operation on the parameter coded message using a private key of the first secure micro-controller to generate a corresponding parameter signature; and
the first control circuit configuring the parameter signature or a corresponding encrypted parameter signature to be the first-station parameter message, wherein the encrypted parameter signature is generated by the first secure micro-controller by encrypting the parameter signature.

8. The collaborative operating system of claim 1, wherein the second secure micro-controller is further arranged to perform a message recoverable signature algorithm operation on a target parameter signature corresponding to the first-station parameter message using a public key of the first secure micro-controller to generate a recovered parameter coded message containing a recovered parameter digest value and a recovered parameter string, and the second control circuit is further arranged to extract the first target parameter or a corresponding encrypted target parameter from the recovered parameter string, to generate a target parameter digest value according to the first target parameter or the encrypted target parameter, and to compare the target parameter digest value with the recovered parameter digest value;
wherein the first-station parameter message is allowed to pass the authentication processes conducted by the second secure micro-controller and the second control circuit only when the recovered parameter coded message is successfully generated by the second secure micro-controller while the target parameter digest value matches with the recovered parameter digest value.

9. The collaborative operating system of claim 8, wherein the second secure micro-controller is further arranged to decrypt the first-station parameter message to generate the target parameter signature;
wherein the first-station parameter message is not allowed to pass the authentication processes conducted by the second secure micro-controller when the second secure micro-controller fails to successfully decrypt the first-station parameter message.

10. The collaborative operating system of claim 8, wherein the second secure micro-controller is further arranged to decrypt the encrypted target parameter to generate the first target parameter;
wherein the first-station parameter message is not allowed to pass the authentication processes conducted by the second secure micro-controller when the second secure micro-controller fails to successfully decrypt the encrypted target parameter.

* * * * *